US010546199B2

(12) United States Patent
Kanda et al.

(10) Patent No.: US 10,546,199 B2
(45) Date of Patent: Jan. 28, 2020

(54) PERSON COUNTING AREA SETTING METHOD, PERSON COUNTING AREA SETTING PROGRAM, MOVING LINE ANALYSIS SYSTEM, CAMERA DEVICE, AND PERSON COUNTING PROGRAM

(71) Applicant: Panasonic Intellectual Property Management Co., Ltd., Osaka (JP)

(72) Inventors: Marie Kanda, Fukuoka (JP); Takayuki Tohdoh, Fukuoka (JP); Yoshiyuki Kubota, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/851,201

(22) Filed: Dec. 21, 2017

(65) Prior Publication Data

US 2018/0181815 A1    Jun. 28, 2018

(30) Foreign Application Priority Data

Dec. 28, 2016  (JP) ................................. 2016-256843

(51) Int. Cl.
G06K 9/00        (2006.01)
G06K 9/46        (2006.01)
G06T 11/00       (2006.01)
G06F 3/0481      (2013.01)
H04N 7/18        (2006.01)

(52) U.S. Cl.
CPC ..... *G06K 9/00771* (2013.01); *G06F 3/04817* (2013.01); *G06K 9/46* (2013.01); *G06T 11/00* (2013.01); *H04N 7/18* (2013.01); *G06T 2207/10016* (2013.01)

(58) Field of Classification Search
CPC ....................... G06K 9/00771; G06Q 30/0201
See application file for complete search history.

(56) References Cited

U.S. PATENT DOCUMENTS 5,485,561 A *  1/1996  Iizuka ................. G06F 3/04845
                                                        382/282
9,165,212 B1  10/2015  Watanabe et al.
2004/0218784 A1* 11/2004  Nichani ................... G01V 8/10
                                                        382/103

(Continued)

FOREIGN PATENT DOCUMENTS

EP    3 163 872 A1    5/2017
JP    2012-203680 A   10/2012

(Continued)

*Primary Examiner* — Vincent Rudolph
*Assistant Examiner* — Raphael Schwartz
(74) *Attorney, Agent, or Firm* — Seed IP Law Group LLP

(57) ABSTRACT

A person counting area setting method includes displaying a captured image of an imaging area captured by a camera device on a display, generating an image of a person counting area for counting the number of one or more persons who pass through a gate pictured on the captured image displayed on the display and displaying the generated image on the display such that the generated image is superimposed on the captured image based on a first parameter indicating a position of the gate in a case where the first parameter is input, and transmitting the information regarding the person counting area to the camera device and setting the transmitted information for the camera device.

9 Claims, 13 Drawing Sheets

(56) References Cited

U.S. PATENT DOCUMENTS

| | | | |
|---|---|---|---|
| 2011/0137132 A1* | 6/2011 | Gustafson | G16H 50/70 600/300 |
| 2014/0132758 A1* | 5/2014 | Saptharishi | H04N 7/18 348/135 |
| 2015/0077568 A1* | 3/2015 | Tsunematsu | G08B 13/19645 348/159 |
| 2015/0294183 A1 | 10/2015 | Watanabe et al. | |
| 2015/0379725 A1 | 12/2015 | Kuwahara et al. | |

FOREIGN PATENT DOCUMENTS

| | | |
|---|---|---|
| JP | 2015-203912 A | 11/2015 |
| JP | 5838371 B1 | 1/2016 |

* cited by examiner

PERSON COUNTING AREA SETTING METHOD, PERSON COUNTING AREA SETTING PROGRAM, MOVING LINE ANALYSIS SYSTEM, CAMERA DEVICE, AND PERSON COUNTING PROGRAM

BACKGROUND

1. Technical Field

The present disclosure relates a person counting area setting method, a person counting area setting program, and a moving line analysis system for setting a person counting area within a captured image of a camera device, and a camera device and a person counting program for counting the number of persons who pass through the set person counting area.

2. Description of the Related Art

In recent years, a surveillance system in which a camera that images an inside of a store is installed and persons within the store are monitored based on a captured image of the camera in a small-scale store such as a convenience store or a large-scale store such as a shopping mall has been widely used. The persons who pass through a gate of the store are detected by using the captured image of the camera, and thus, the number of persons who go in or go out of the shop is counted. Accordingly, such counting information can be utilized in marketing analysis such as improvement measures for efficiently operating the store, and is useful for improving sales and profits of the store.

A person counting device that counts the number of persons who pass through the gate based on the captured image acquired by imaging an area near the gate through which the persons go in or go out of a predetermined place of the store has been known (for example, Japanese Patent Unexamined Publication No. 2015-203912).

However, a skilled installer who has abundant experiences is requested in order to do a task for setting the person counting area for counting the number of persons who pass through the gate, and thus, there is a problem that an unskilled person is not able to easily set the person counting area. A specific method for solving the problem is not disclosed even in Japanese Patent Unexamined Publication No. 2015-203912. Since the number of cameras to be installed becomes large in the large-scale store such as the shopping mall, it takes a considerable amount of time to set a desired person counting area within a viewing angle of each camera, and it is difficult to easily set the person counting area.

SUMMARY

In order to solve the problems of the related art, an object of the present disclosure is to provide a person counting area setting method, a person counting area setting program, and a moving line analysis system which are capable of easily setting a person counting area within a captured image of a camera device and are capable of improving usability of an operator regardless of whether or not the operator is an expert who has abundant experiences of a task for setting the person counting area.

In order to solve the problems of the related art, another object of the present disclosure is to provide a camera device and a person counting program for accurately counting the number of persons who pass through a person counting area set within an imaging range of a video and contributing to surveillance in an imaging area or marketing analysis based on a change in the number of persons.

The present disclosure provides a person counting area setting method including: displaying a captured image of an imaging area captured by a camera device on a display unit, generating an image of a person counting area for counting the number of one or more persons who pass through a gate pictured on the captured image displayed on the display unit and displaying the generated image on the display unit such that the generated image is superimposed on the captured image based on a first parameter indicating a position of the gate in a case where the first parameter is input, and transmitting information regarding the person counting area to the camera device and setting the transmitted information for the camera device.

The present disclosure provides a person counting area setting program causing a server device which is a computer to perform a step of displaying a captured image of an imaging area captured by a camera device on a display unit, a step of generating an image of a person counting area for counting the number of one or more persons who pass through a gate pictured on the captured image displayed on the display unit and displaying the generated image on the display unit such that the generated image is superimposed on the captured image based on a first parameter indicating a position of the gate in a case where the first parameter is input, and a step of transmitting information regarding the person counting area to the camera device and setting the transmitted information for the camera device.

The present disclosure provides a moving line analysis system in which a camera device and a server device are connected to each other. The server device is configured to display a captured image acquired by the camera device on a display unit, generate an image of a person counting area for counting the number of one or more persons who pass through a gate pictured on the captured image displayed on the display unit and display the generated image on the display unit such that the generated image is superimposed on the captured image based on a first parameter indicating a position of the gate in a case where the first parameter is input, and transmit information regarding the person counting area to the camera device. The camera device is configured to set the information regarding the person counting area transmitted from the server device, count the number of persons who pass through the person counting area based on the person counting area set for the captured image, and transmit the captured image acquired for a predetermined period in association with a counting result of the number of persons who pass through the person counting area to the server device.

The present disclosure provides a camera device connected to a server device. The camera device includes a capture that images an imaging area, an acquirer that acquires information regarding a person counting area for counting the number of one or more persons who pass through a gate pictured on a captured image of the imaging area from the server device, a setter that sets the person counting area of the captured image by using the acquired information regarding the person counting area, a counter that counts the number of persons who pass through the person counting area based on the person counting area set for the captured image, and a transmitter that transmits the captured image acquired for a predetermined period in association with a counting result of the number of persons who pass through the person counting area to the server device.

The present disclosure provides a person counting program causing a camera device as a computer connected to a server device to perform a step of imaging an imaging area, a step of acquiring information regarding a person counting area for counting the number of one or more persons who pass through a gate pictured on a captured image of the imaging area from the server device, a step of setting the person counting area of the captured image by using the acquired information regarding the person counting area, a step of counting the number of persons who pass through the person counting area based on the person counting area set for the captured image, and a step of transmitting the captured image acquired for a predetermined period in association with a counting result of the number of persons who pass through the person counting area to the server device.

According to the present disclosure, it is possible to easily set a person counting area within a captured image of a camera device and it is possible to improve usability of an operator regardless of whether or not the operator is an expert who has abundant experiences of a task for setting the person counting area.

According to the present disclosure, it is possible to accurately count the number of persons who pass through a person counting area set within an imaging range of a video, and it is possible to contribute to surveillance in an imaging area or marketing analysis based on a change in the number of persons.

DETAILED DESCRIPTION

Hereinafter, an exemplary embodiment (hereinafter, referred to as a "present exemplary embodiment") that specifically discloses a person counting area setting method, a person counting area setting program, a moving line analysis system, a camera device, and a person counting program in detail will be appropriately described in detail with reference to the drawings. Unnecessarily detailed description may be omitted. For example, the detailed description of already well-known matters or the redundant description of substantially same configurations may be omitted. This is to avoid the unnecessary redundancy in the following description and help those skilled in the art to understand the embodiments. The accompanying drawings and the following description are provided in order for those skilled in the art to sufficiently understand the present disclosure, and are not intended to limit the subject matters described in claims.

For example, moving line analysis system 500A according to the present exemplary embodiment is configured such that a plurality of camera devices is installed in a store (for example, a large-scale store such as a shopping mall or a department store). A place in which moving line analysis system 500A is installed is not limited to the large-scale store such as the shopping mall or the department store, and may be a place (for example, a small-scale store such as a convenience store, a public facility such as a library, a factory, or an office building) in which there is a plurality of moving objects (for example, persons; the same applies later).

Figure 1:
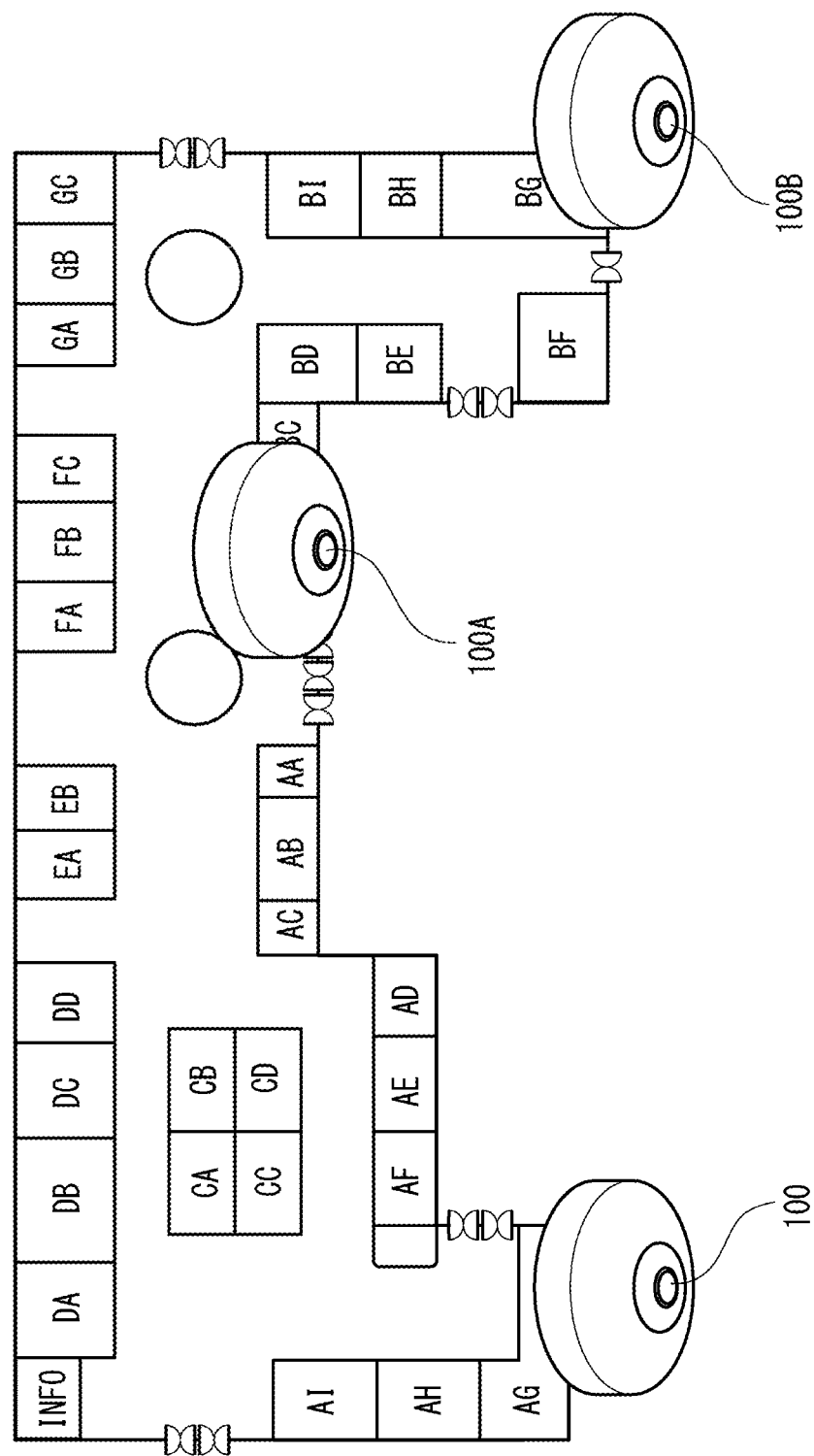
FIG. 1 is a sketch showing an example of floor 1 of a shopping mall (store) in which camera devices according to the present exemplary embodiment are arranged.

FIG. 1 is a sketch showing an example of floor 1 of a shopping mall (store) in which camera devices 100, 100A, and 100B according to the present exemplary embodiment are arranged. In the following description, the shopping mall is referred to as a "store" in some cases. All camera devices 100, 100A, and 100B have the same configuration, and the detailed internal configuration thereof will be described below with reference to FIG. 3. Although only three camera devices 100, 100A, and 100B are shown in FIG. 1, the number of camera devices to be installed is not limited, and the number of camera devices to be installed may be one, two, or four or more.

Each of camera devices 100, 100A, and 100B serves as a surveillance camera for monitoring an imaging area within a viewing angle within the store. Each of camera devices 100, 100A, and 100B acquires moving line information indicating the movement (for example, whether or not a person stands and stays in a certain place or whether or not a person passes through a certain place) of a person who appears in a captured image of the imaging area within the viewing angle, and counts the number of persons who pass through a person counting area in a case where a parameter (specifically, information regarding the person counting area) transmitted from server device 300 is set.

Camera devices 100, 100A, and 100B are installed so as to include automatic doors installed in gates between the inside of the store and the outside of the store, as the viewing angle. Accordingly, each of camera devices 100, 100A, and 100B can count the number of persons who cross over (pass through) a line (to be described below) set near the automatic door included in the viewing angle.

For example, the camera device according to the present exemplary embodiment may be installed so as to include a space between shops adjacent to each other within the store, as the viewing angle, or may be installed so as to include a space (that is, an aisle or a bench that persons stay in or pass through) between shops facing each other with an aisle present therebetween within the store, as the viewing angle. In this case, the camera device may count the number of persons who pass through a line set near the space between the shops adjacent to each other, or may count the number of persons who pass through a line set near the space between the shops facing each other within the store.

Figure 2:
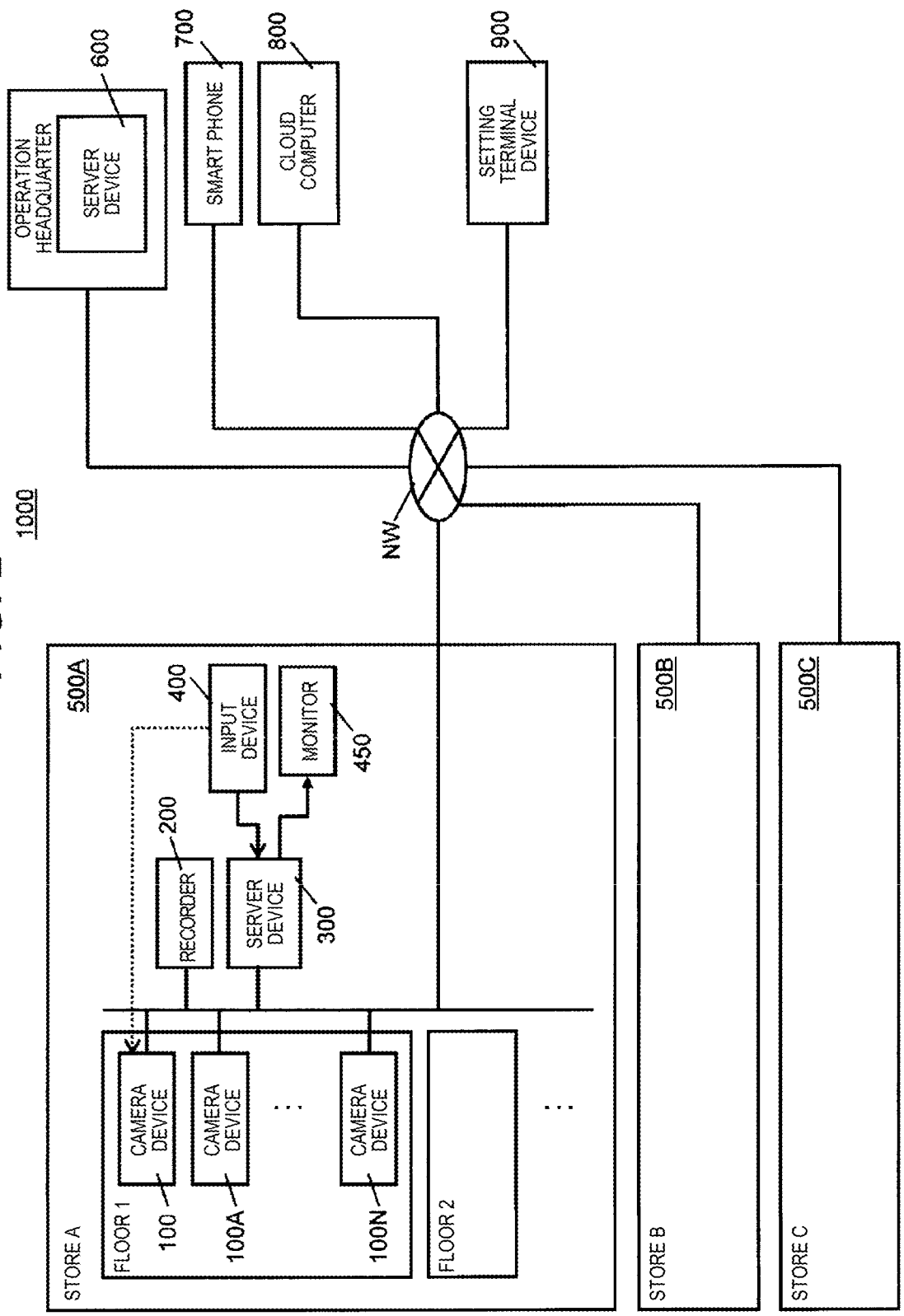
FIG. 2 is a system configuration diagram showing an example of a system configuration of a sales management system including a moving line analysis system according to the present exemplary embodiment in detail.

In the present exemplary embodiment, for example, moving line analysis systems 500A, 500B, 500C, . . . according to the present exemplary embodiment are respectively installed in a plurality of stores, and sales management system 1000 is also configured such that the plurality of moving line analysis systems 500A, 500B, 500C, . . . is connected through network NW, as shown in FIG. 2. The exemplary embodiment of moving line analysis systems 500A, 500B, and 500C according to the present exemplary embodiment is not limited to the contents to be described below.

FIG. 2 is a system configuration diagram showing an example of a system configuration of sales management system 1000 including moving line analysis systems 500A, 500B, and 500C according to the present exemplary embodiment in detail. Sales management system 1000 shown in FIG. 2 includes moving line analysis systems 500A, 500B, 500C, . . . which are respectively installed in a plurality of stores A, B, C, . . . , server device 600 of an operation headquarter, smartphone 700 used by, for example, an employee of the operation headquarter, external cloud computer 800, and setting terminal device 900.

Moving line analysis systems 500A, 500B, and 500C, server device 600 of the operation headquarter, smartphone 700, cloud computer 800, and setting terminal device 900 are connected to each another through network NW. Network NW is a wireless network or a wired network. For example, the wireless network is a wireless local area network (LAN), a wireless wide area network (WAN), a 3rd generation mobile communication system (3G), Long-Term Evolution (LTE), LTE-Advanced, a 5th generation mobile communication system (5G), or Wireless Gigabit (WiGig). For example, the wired network is an intranet or the Internet.

Moving line analysis system 500A installed in store A shown in FIG. 2 includes a plurality of camera devices 100, 100A, . . . , and 100N (only three camera devices 100, 100A, and 100B are shown in FIG. 1 as described above) installed on floor 1 of FIG. 1, recorder 200, server device 300, input device 400, and monitor 450. Similarly to floor 1, a plurality of camera devices is also installed on floor 2, and the camera devices on floor 2 are not shown. Camera devices 100, 100A, . . . , and 100N have the same internal configuration, and the details thereof will be described with reference to FIG. 3.

For example, recorder 200 is constituted by s a semiconductor memory or a hard disk device, and stores data of a video (hereinafter, a video captured by the camera device is referred to as a "captured image") captured by each camera device installed within store A. The data of the captured image stored in recorder 200 is used in a monitoring task such as crime prevention or a marketing analysis task contributing to an operation of the store.

For example, server device 300 is constituted by a personal computer (PC), and notifies camera device 100 of information indicating that a predetermined event (for example, a change in layout of shops on floor 1 of store A) occurs in response to an input operation of a user (for example, who is a user of moving line analysis system 500A and refers to a salesperson or a manager of store A; the same applies later) who operates input device 400.

Server device 300 generates moving line analysis image acquired by superimposing the moving line information of the person who appears in the imaging area of the camera device on the captured image of the camera device or a background image by using the moving line information of the person who comes and goes within the viewing angle which is transmitted from the camera device, and displays the generated moving line analysis image on monitor 450 (an example of a display unit). The person who comes and goes within the viewing angle is, for example, a salesperson, a manager, or a visiting customer. The same applies later. The moving line information of the person is information indicating a position in which the person stays, and is information indicating a position in which the person passes through.

Server device 300 performs a predetermined process (for example, a process of generating a moving line analysis report) in response to an input operation of the user who operates input device 400, and displays a moving line analysis report on monitor 450.

Server device 300 display a setting screen (for example, see FIG. 4 or 5) for setting a person detection area (for example, line) for counting the number of persons in the captured image (that is, within viewing angle) of the camera device on monitor 450 to each camera device in response to an input operation of the user who operates input device 400. Server device 300 transmits a parameter (that is, information regarding the person detection area) determined in response to the input operation of the user performed on the setting screen displayed on monitor 450 to the corresponding camera device. The camera device may count the number of persons who pass through the person detection area set within the viewing angle by setting the parameter transmitted from server device 300. For example, the counting result may contribute to a marketing analysis task for ascertaining sales trends based on the number of persons in each time zone, or may contribute to a monitoring task for ascertaining an increase or a decrease in number of security guards based on the number of persons who go in and out of the store. The detailed internal configuration of server device 300 will be described below with reference to FIG. 3.

For example, input device 400 is constituted by a mouse, a keyboard, a touch panel, or a touchpad, and outputs a signal corresponding to an input operation of the user to camera device 100 or server device 300. Although only an arrow between input device 400 and camera device 100 is shown in FIG. 2 for simplicity in illustration, arrows between input device 400 and other camera devices (for example, camera devices 100A and 100N) may be shown.

For example, monitor 450 is constituted by a liquid crystal display (LCD) or an organic electroluminescence (EL), and displays the moving line analysis image generated by server device 300, the moving line analysis report, and the setting screen (for example, see FIG. 4 or 5) of the person counting area. Monitor 450 is provided as an external device different from server device 300, but may be included within server device 300.

Server device 600 of the operation headquarter is a browsing device that acquires the moving line analysis reports or the moving line analysis images generated in moving line analysis systems 500A, 500B, 500C, . . . installed within stores A, B, C, . . . in response to an input operation of an employee (for example, an executive) of the operation headquarter who operates server device 600 of the operation headquarter and displays the acquired moving line analysis reports or moving line analysis images. Server device 600 of the operation headquarter retains various information items (for example, sales information, visitor count information, event schedule information, highest temperature information, and lowest temperature information) required to generate the moving line analysis reports (for example, see FIG. 12 or 13). These various information items may be retained in the server devices provided in stores A, B, C, . . . . Server device 600 of the operation headquarter may perform various processes of the server devices (for example, server device 300 in store A) installed in stores A, B, C, . . . . Accordingly, server device 600 of the operation headquarter can generate the moving line analysis report (for example, see FIG. 12 or 13) acquired by aggregating data items of stores A, B, C, . . . , and can acquire details data (for example, the moving line analysis report shown in FIG. 12 or 13) of one store selected in response to the input operation performed on server device 600 of the operation headquarter. The server device can display data comparison result of a specific shop (for example, a meat shop) between the plurality of stores.

Smartphone 700 is a browsing device that acquires the moving line analysis reports or the moving line analysis images generated in moving line analysis systems 500A, 500B, 500C, . . . installed in stores A, B, C, . . . in response to an input operation of an employee of the operation headquarter who operates smartphone 700, and displays the acquired moving line analysis images or moving line analysis reports.

Cloud computer 800 is an online storage that stores data items of the moving line analysis reports or the moving line analysis images generated in moving line analysis systems 500A, 500B, 500C, . . . installed in stores A, B, C, . . . . In response to the input operation of the employee (for example, a person in charge of sales) of the operation headquarter who operates smartphone 700, the cloud computer performs a predetermined process (for example, the searching and extracting of the moving line analysis report on X month Y day), and transmits the processing result to smartphone 700.

For example, setting terminal device 900 is constituted by a PC, and may execute dedicated browser software for displaying the setting screen of the camera devices of moving line analysis systems 500A, 500B, 500C, . . . installed in stores A, B, C, . . . . In response to the input operation of the employee (for example, a system administrator of sales management system 1000) of the operation headquarter who operates setting terminal device 900, setting terminal device 900 displays the setting screen (for example, common gateway interface (CGI)) of the camera device by using the browser software, and sets information acquired by aggregating (modifying, adding, or removing) setting information items of the camera devices.

Figure 3:
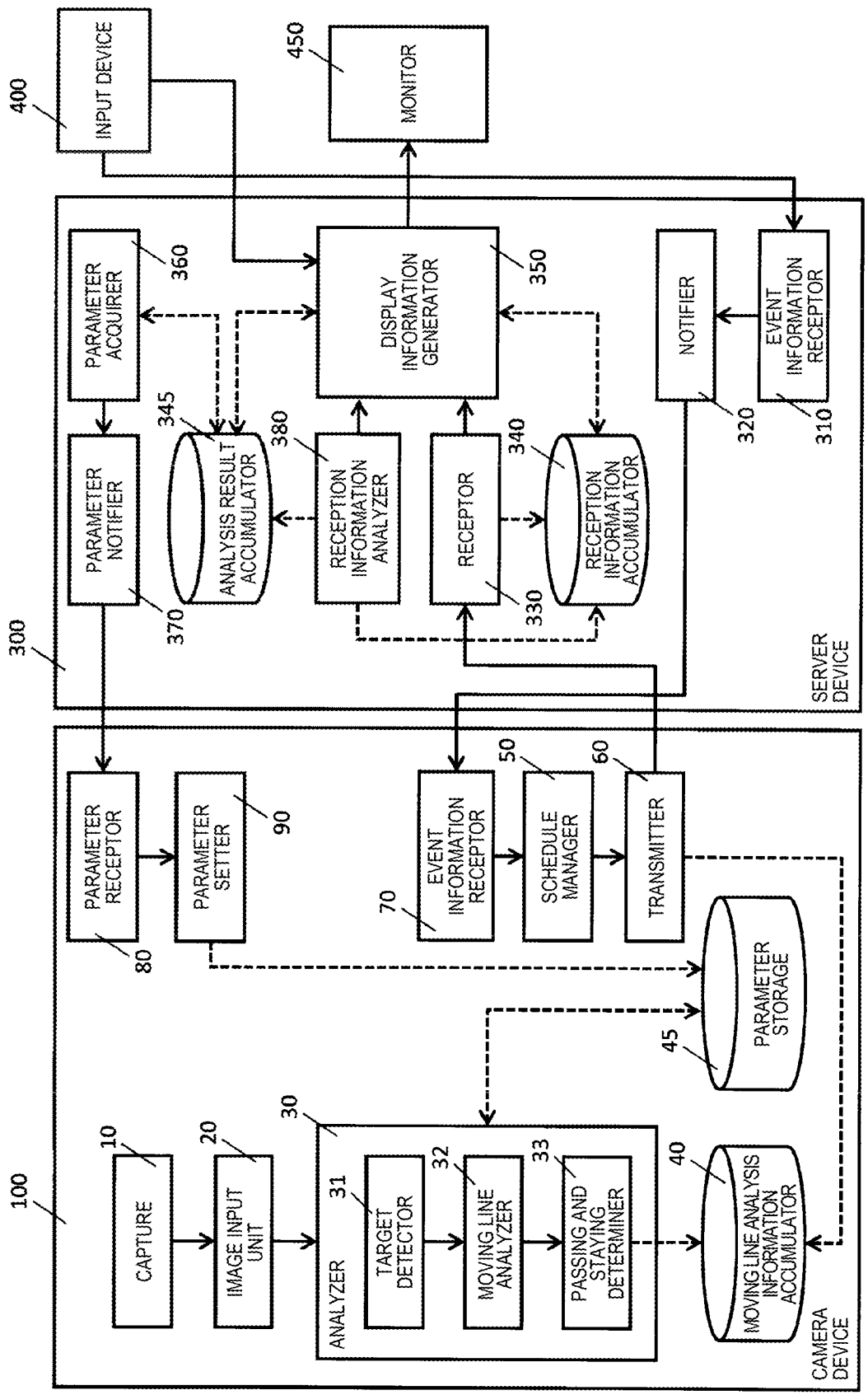
FIG. 3 is a block diagram showing an example of functional internal configurations of a camera device and a server device according to the present exemplary embodiment in detail.

FIG. 3 is a block diagram showing an example of functional internal configurations of camera device 100 and server device 300 according to the present exemplary embodiment in detail. The camera devices installed in stores A, B, C, . . . have the same configuration in sales management system 1000 shown in FIG. 2, camera device 100 will be described as an example in FIG. 3.

Camera device 100 shown in FIG. 3 includes capture 10, image input unit 20, analyzer 30, moving line analysis information accumulator 40, parameter storage 45, schedule manager 50, transmitter 60, event information receptor 70, parameter receptor 80, and parameter setter 90. Analyzer 30 includes target detector 31, moving line analyzer 32, and passing and staying determiner 33.

Capture 10 includes at least of a lens and an image sensor. The lens concentrates light (light ray) incident from outside camera device 100, and forms the concentrated light on a predetermined imaging surface of the image sensor. A fisheye lens or a wide-angle lens that covers a viewing angle of, for example, 140 degrees or more is used as the lens. For example, the image sensor is a solid-state imaging element of a charge-coupled device (CCD) or a complementary metal oxide semiconductor (CMOS), and converts an optical image formed on the imaging surface into an electric signal.

For example, image input unit 20 is constituted by a central processing unit (CPU), a micro processing unit (MPU), or a digital signal processor (DSP). The image input unit generates data items (frames) of the captured images prescribed by YUV (luminance and color difference) or RGB (Red Green Blue) capable of being recognized by a person by performing predetermined signal processing on the electric signal from capture 10, and outputs the generated data items to analyzer 30.

Although not shown in FIG. 3, camera device 100 may include a background image generator that generates background images (that is, images on which moving objects such as persons are not present within the captured images) by using the captured image generated by image input unit 20. Accordingly, camera device 100 can generate background images in consideration of the privacy of the persons. The detailed configuration of the background image generator is the same as the configuration disclosed in Japanese Patent No. 5838371 invented by some inventors of the present disclosure, and thus, the detailed description thereof will be omitted.

For example, the background image generator is constituted by a CPU, a MPU, or a DSP, and generates background images acquired by excluding moving objects (for example, persons) included in the captured images for data items (frames) of the captured images output from image input unit 20 at a predetermined frame rate (for example, 30 frames per second (fps)). For example, a method disclosed in Japanese Patent Unexamined Publication No. 2012-203680 may be used as the process of generating the background images in the background image generator, but is not limited to the method disclosed in this patent document.

For example, analyzer 30 is constituted by a CPU, a MPU, or a DSP. The analyzer detects moving line information including staying positions or passing positions of the moving objects (for example, persons) included in the captured images for the data items (frames) of the captured images output from image input unit 20 at a predetermined frame rate (for example, 10 fps), and retains the detected moving line information in moving line analysis information accumulator 40.

Target detector 31 detects whether or not the moving objects (for example, persons) included in the frames of the captured images are present by performing known image processing (for example, a person detection process or a face detection process) on the frames of the captured images output from image input unit 20. In a case where the persons included in the frame of the captured image are detected, target detector 31 outputs information regarding the persons in the frames of the captured images and information (for example, coordinate information of the persons in the frames) regarding a detection area of the persons to moving line analyzer 32. In a case where the persons included in the frames of the captured images are not detected, target detector 31 outputs information (for example, predetermined null information) regarding the detection area of the persons to moving line analyzer 32.

Moving line analyzer 32 associates information items regarding a current detection area and a past detection area based on the information regarding the detection areas of the persons output from target detector 31 by using information regarding the captured images output from image input unit 20 and information (for example, captured image information or coordinate information) regarding a past detection area of the person, and outputs the associated information items to passing and staying determiner 33, as moving line information (for example, a change amount of the coordinate information of the detection areas of the persons).

Passing and staying determiner 33 extracts and generates moving line information ("target position information", "moving line information", and "information regarding the passing position or the staying position) including the staying positions or the passing positions of the moving objects (for example, persons) in the frames of the captured images based on the moving line information output from moving line analyzer 32 for the plurality of captured images. Passing and staying determiner 33 may generate a visualization image of color portions of a moving line analysis image (heat map image) generated in display information generator 350 of server device 300 by using the extraction result of the moving line information regarding the staying positions or the passing positions of the persons.

Passing and staying determiner 33 may extract and may generate accurate moving line information regarding positions in which the persons stay or positions through which person pass from the frames of the captured images output from image input unit 20 by using the moving line information for the frames of the plurality of captured images.

Passing and staying determiner 33 as an example of a counter constantly counts the number of persons who pass through the person counting area based on the parameter of the person counting area (for example, the line, the person detection area, or the mask area) retained in parameter storage 45. Passing and staying determiner 33 stores the counting result of the number of persons and the counting times in association with each other in moving line analysis information accumulator 40. The number of persons who pass through the person counting area may be constantly counted by not passing and staying determiner 33 but moving line analyzer 32.

For example, moving line analysis information accumulator 40 is constituted by a semiconductor memory or a hard disk device, and stores data of the extraction result (for example, "target position information", "moving line information", and "information regarding passing situation or staying situation") of the moving line information regarding the staying positions or the passing positions of the persons generated by analyzer 30. Moving line analysis information accumulator 40 stores data of the counting result (including counting time information) of the number of persons who pass through the person counting area. Moving line analysis information accumulator 40 stores data of the captured image (captured image) acquired by image input unit 20 and data of the background image generated by background image generator (not shown).

For example, parameter storage 45 is constituted by a semiconductor memory or a hard disk device, and stores information of the parameter (specifically, positional information such as coordinates of the person counting area set within the viewing angle of camera device 100) transmitted from server device 300 or another external device (for example, a common gate interface (CGI) such as a camera setting screen).

For example, schedule manager 50 is constituted by a CPU, a MPU, or a DSP, and notifies transmitter 60 of a predetermined transmission cycle for regularly transmitting the data of the captured images or the background images, the data of the extraction result of the moving line information regarding the staying information or the passing information of the persons, and the data of the counting result of the number of persons who pass through the person counting area which are stored in moving line analysis information accumulator 40 to server device 300. For example, the predetermined transmission cycle is 15 minutes, 1 hour, 12 hours, or 24 hours, but is not limited to these time intervals.

According to an instruction from schedule manager 50 or event information receptor 70, transmitter 60 acquires the data of the captured images or the background images, the data of the extraction result of the moving line information regarding the staying information or the passing information of the persons, and the data of the counting result of the number of persons who pass the person counting area which are stored in moving line analysis information accumulator 40, and transmits the acquired data items to server device 300. Accordingly, camera device 100 aggregates transmission target data items (that is, the data of the captured images or the background images, the data of the extraction result of the moving line information regarding the staying information or the passing information of the persons, and the data of the counting result of the number of persons who pass the person counting area) collected for a predetermined period, and transmits the aggregated data items to server device 300. A transmission timing of transmitter 60 is the same as that in the method disclosed in Japanese Patent No. 5838371 invented by some inventors of the present disclosure, and thus, the detailed description thereof will be omitted.

Event information receptor 70 receives (acquires) notification indicating that a predetermined event (for example, a change in layout of shops on floor 1 of store A) is detected from server device 300 or input device 400, and receives the notification indicating that the predetermined event is detected. In response to the reception of the notification, event information receptor 70 outputs an instruction to transmit the data of the captured images or the background images, the data of the extraction result of the moving line information regarding the staying information or the passing information of the persons, and the data of the counting result of the number of persons who pass the person counting area which are stored in moving line analysis information accumulator 40 to server device 300 to transmitter 60. In a case where notification indicating that a predetermined event occurs is output based on a timer operation set for schedule manager 50, event information receptor 70 may be omitted from the configuration of camera device 100.

Parameter receptor 80 as an example of an acquirer receives information (specifically, positional information such as coordinates of the person counting area set within the viewing angle of camera device 100) of the parameter transmitted from server device 300 or another external device, and outputs the received information to parameter setter 90.

For example, parameter setter 90 as an example of a setter is constituted by a CPU, a MPU, or a DSP, and writes and stores the information (specifically, positional information such as coordinates of the person counting area set within the viewing angle of camera device 100) regarding the parameter output from parameter receptor 80 in parameter storage 45. Accordingly, parameter setter 90 can set the parameter of the positional information of the person counting area on the captured image (captured image).

Server device 300 shown in FIG. 3 includes event information receptor 310, notifier 320, receptor 330, reception information accumulator 340, analysis result accumulator 345, display information generator 350, parameter acquirer 360, parameter notifier 370, and reception information analyzer 380.

In a case where information indicating that a predetermined event (for example, a change in layout of shops on floor 1 of store A) occurs is input to the corresponding camera device from input device 400, event information receptor 310 receives the notification indicating that the predetermined event is detected. Event information receptor 310 outputs information indicating that the notification indicating that the predetermined event is detected is received to notifier 320. The information indicating that the predetermined event occurs includes an identification number of the camera device that images a place in which the predetermined event occurs, as an imaging area.

Notifier 320 transmits the notification indicating that the predetermined event is detected which is output from event information receptor 310 to the corresponding camera device.

Receptor 330 receives the transmission target data items (that is, the data of the captured images or the background images, the data of the extraction result of the moving line information regarding the staying information or the passing information of the persons, and the data of the counting result of the number of persons who pass the person counting area) transmitted from camera device 100, and outputs the received transmission target data items to reception information accumulator 340 and display information generator 350.

For example, reception information accumulator 340 is constituted by a semiconductor memory or a hard disk device, and stores the transmission target data items (that is, the data of the captured images or the background images, the data of the extraction result of the moving line information regarding the staying information or the passing information of the persons, and the data of the counting result of the number of persons who pass the person counting area) received by receptor 330.

For example, analysis result accumulator 345 is constituted by a semiconductor memory or a hard disk device, and stores data (for example, the counting result of the number of persons who pass through the person detection area in each time zone or the analysis result of the moving line information of the persons who appear in the imaging area for each camera device in each time zone) of the analysis result generated by reception information analyzer 380.

For example, display information generator 350 is constituted by a CPU, a MPU, or a DSP, and generates a moving line analysis image acquired by superimposing the moving line information regarding the staying positions or the passing positions of the moving objects on the background image by using the transmission target data items (for example, the data of the captured images or the background images and the data of the extraction result of the moving line information regarding the staying information or the passing information of the persons) acquired from receptor 330 or reception information accumulator 340. Display information generator 350 displays the generated moving line analysis image on monitor 450.

The moving line analysis image is an image acquired by quantitatively visualizing the moving line information visually indicating places in which the moving objects frequently stay in the imaging areas corresponding to the captured images or places in which the moving objects pass within a predetermined range (for example, a value of 0 to 255) on the background image acquired by excluding the persons from the captured images acquired by camera device 100 such that the persons are not pictured like the heat map.

Display information generator 350 generates a graph (for example, see FIG. 11) that visually represents the analysis result by using the data (for example, the data of the counting result of the number of persons who pass through the person detection area in each time zone) of the analysis result generated by reception information analyzer 380. Display information generator 350 displays the generated graph on monitor 450.

Figure 12:
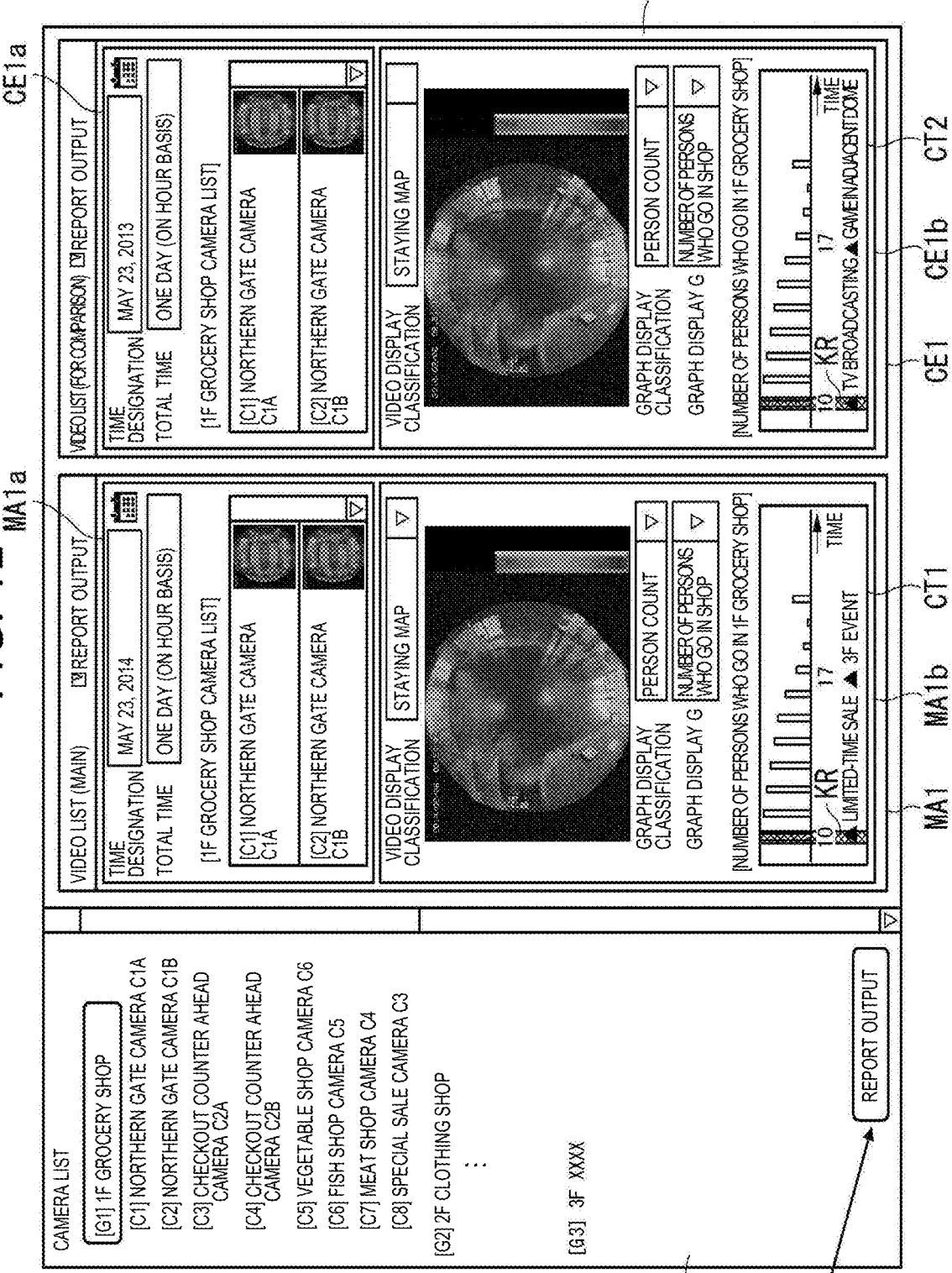
FIG. 12 is a diagram showing an example of an operation screen including a moving line analysis image of store A generated by a display image generator of the server device.
Figure 13:
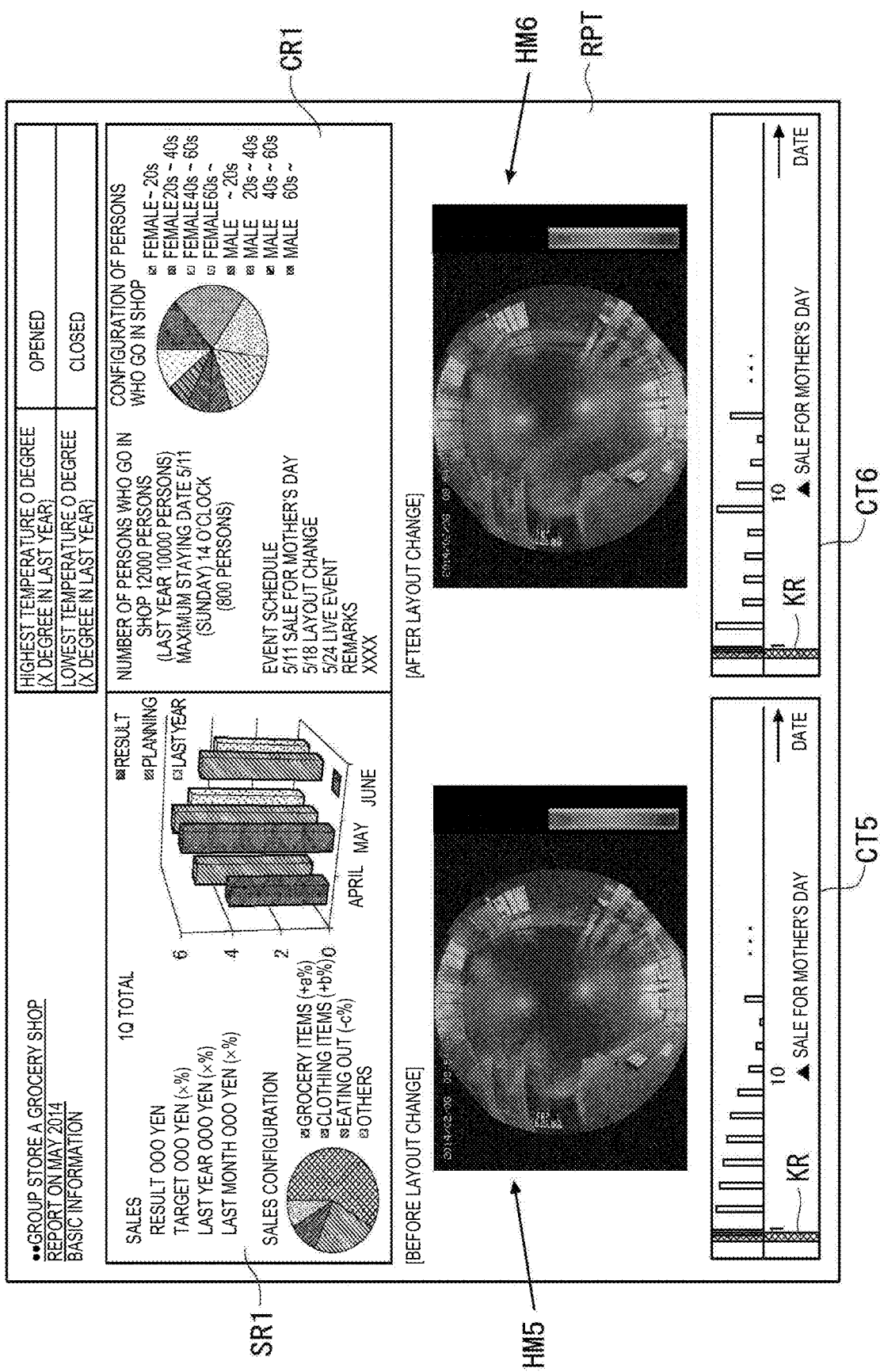
FIG. 13 is a diagram showing an example of an operation screen of a monthly report in a grocery shop of store A on May 2014 which is generated by the display image generator of the server device.

In a case where an instruction to generate the moving line analysis report is input from input device 400, display information generator 350 generates the moving line analysis report (for example, see FIG. 12 or 13). Display information generator 350 displays the generated moving line analysis report on monitor 450.

Figure 4:
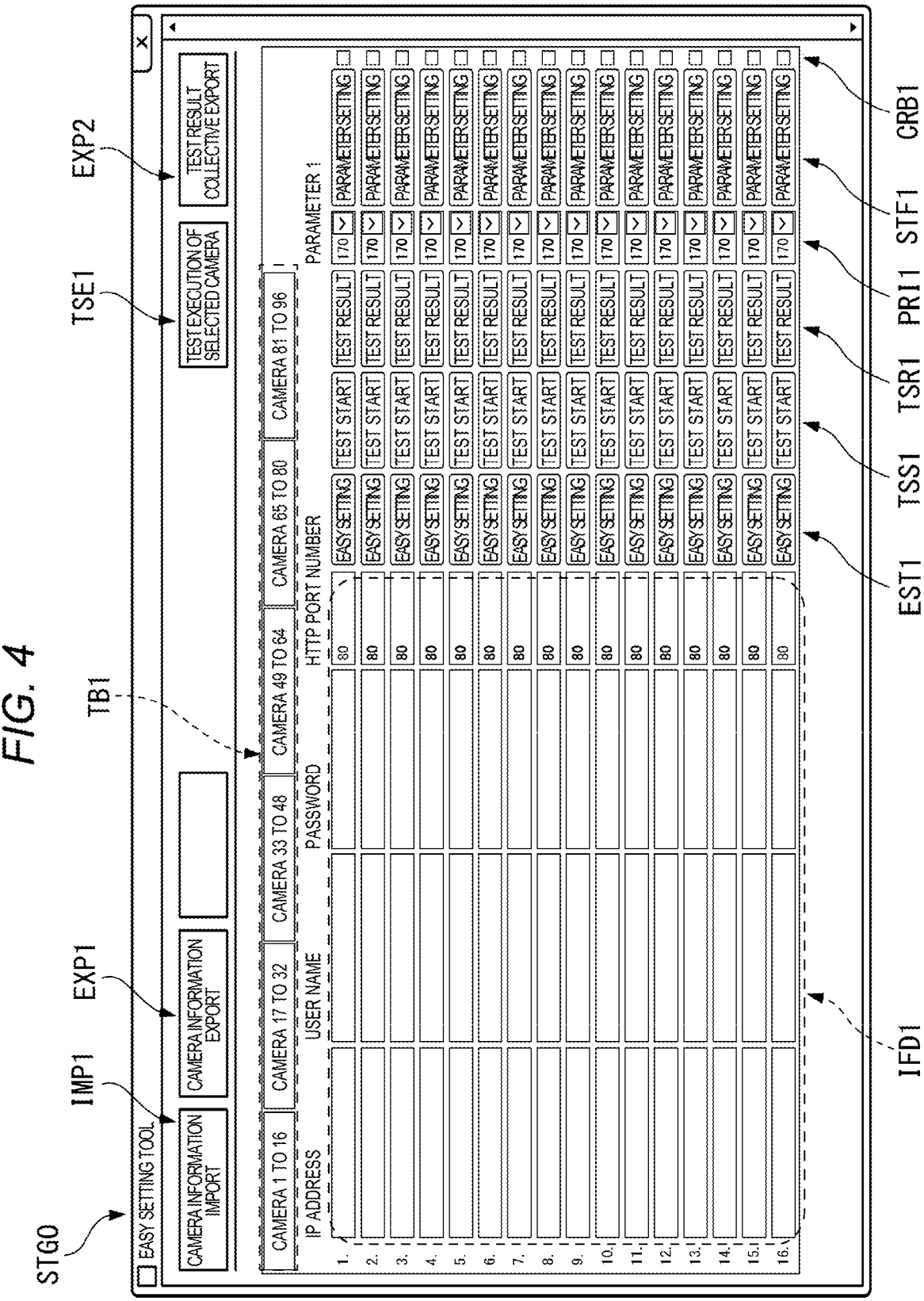
FIG. 4 is a diagram showing an example of a camera information setting screen.
Figure 5:
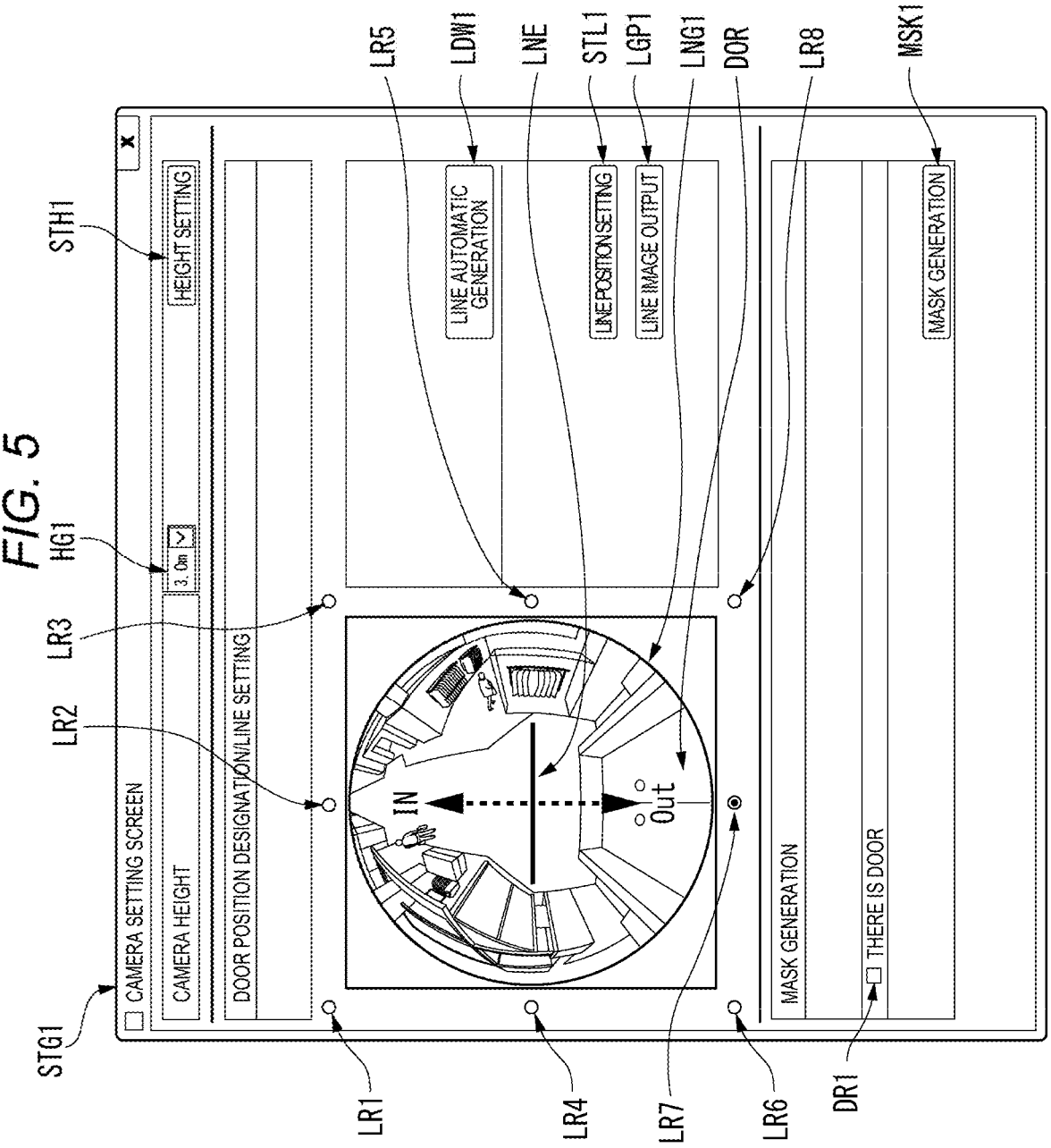
FIG. 5 is a diagram showing an example of a line and mask easy setting screen.
Figure 6:
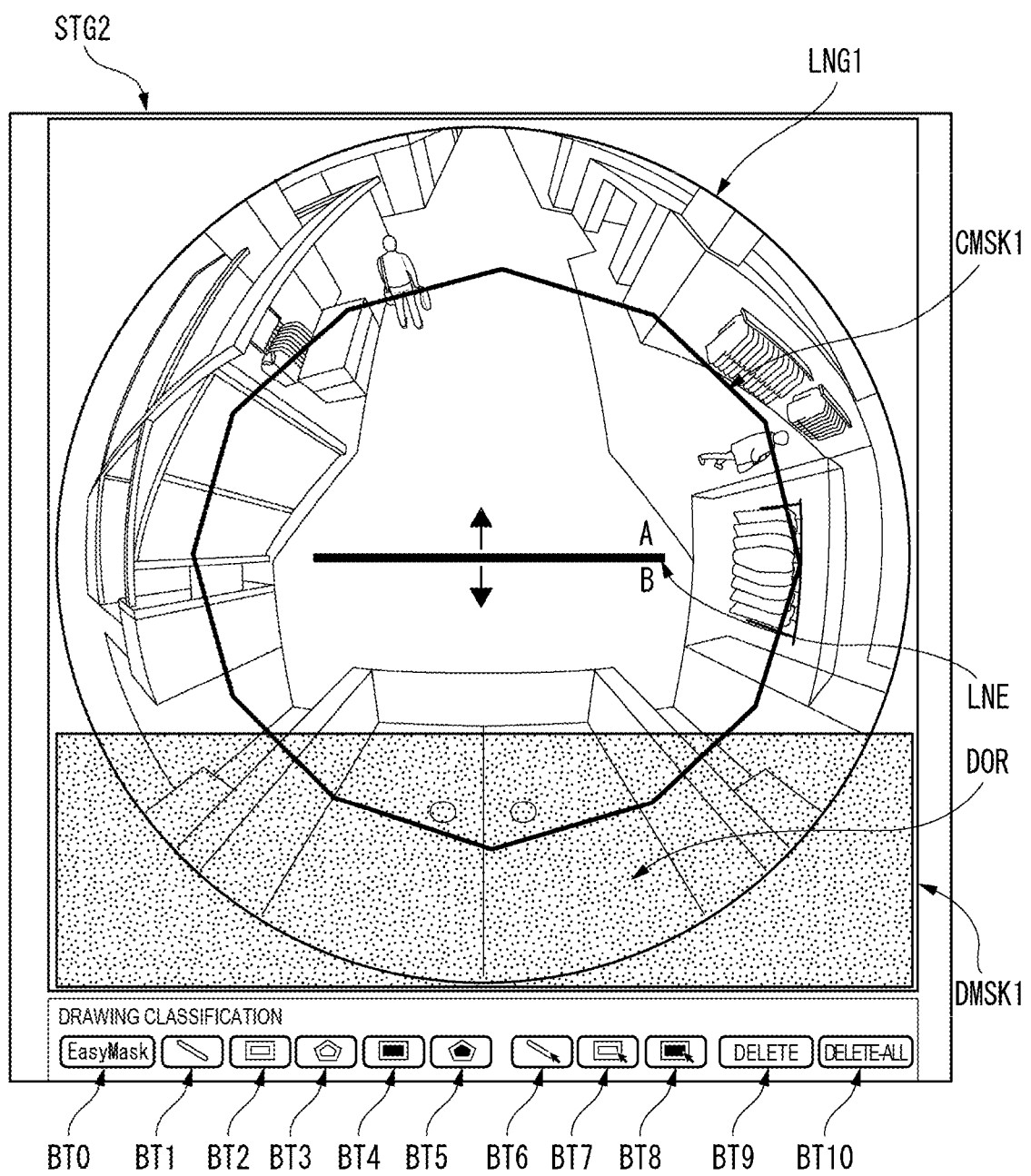
FIG. 6 is a diagram showing an example of a line and mask detail setting screen.

In a case where an instruction to set the person counting area set within the viewing angle of the camera device is input from input device 400, display information generator 350 displays a line and mask easy setting screen shown in FIG. 5 or line and mask detail setting screen STG2 shown in FIG. 6 on monitor 450. For example, the instruction to set the person counting area includes a case where easy setting button EST1 of camera information setting screen STG0 shown in FIG. 4 is pressed (selected) by input device 400.

Parameter acquirer 360 acquires information (parameter) regarding the person counting area set by at least one of line and mask easy setting screen STG1 shown in FIG. 5 and line and mask detail setting screen STG2 shown in FIG. 6 from analysis result accumulator 345 to parameter notifier 370.

Parameter notifier 370 notifies camera device 100 of the information (parameter) regarding the person counting area output from parameter acquirer 360. The information (parameter) regarding the person counting area is received by parameter receptor 80 of camera device 100.

For example, reception information analyzer 380 is constituted by a CPU, a MPU, or a DSP. The reception information analyzer performs various analysis processes on the transmission target data items (that is, the data of the captured images or the background images, the data of the extraction result of the moving line information regarding the staying information or the passing information of the persons, and the data of the counting result of the number of persons who pass the person counting area) stored in reception information accumulator 340, and outputs the processed transmission target data items to display information generator 350 or stores the processed transmission target data items in analysis result accumulator 345. For example, the analysis process is a process of acquiring a change in the number of persons between the time zones by using the counting result of the number of persons who pass through the person counting area for a predetermined period, which is transmitted from camera device 100. The analysis process is not limited to the process of acquiring the change in the number of persons between the time zones.

Camera information setting screen STG0, line and mask easy setting screen STG1, and line and mask detail setting screen STG2 will be described with reference to FIGS. 4, 5, and 6. FIG. 4 is a diagram showing an example of camera information setting screen STG0. FIG. 5 is a diagram showing an example of line and mask easy setting screen STG1. FIG. 6 is a diagram showing an example of line and mask detail setting screen STG2.

For example, camera information setting screen STG0 shown in FIG. 4 is a screen for setting various information items regarding a maximum of 96 camera devices by an operation for switching tab TB1. The camera information setting screen is generated by display information generator 350, and is displayed on monitor 450. For example, setting information items corresponding to camera devices having 16 identification numbers from No. 1 to No. 16 are displayed so as to be input in FIG. 4. For example, an Internet protocol (IP) address, a user name, a password, and a HTTP port number (for example 80) are able to be input in input field IFD1, as the setting information of the camera device, by an operation of the user performed on input device 400.

Camera information import button IMP1 is used to import the information regarding the camera device from server device 300 or the external device. The imported information is displayed in input field IFD1.

Camera information export button EXP1 is used to export the information (for example, the setting information of the camera device) regarding the camera device to the external device.

Easy setting button EST1 of the person counting area to be set within the viewing angle, test start button TSS1, test result button TSR1, input field PRI1 of parameter P1, threshold setting button STF1, and checkbox CRB1 are displayed for each camera device in association with each other.

Easy setting button EST1 is a button for causing display information generator 350 to generate and display line and mask easy setting screen STG1 shown in FIG. 5 through an operation (pressing) of the user performed on input device 400.

Test start button TSS1 is a button for starting a walking test of checking whether or not the setting of the person counting area is appropriate to the camera device for which the person counting area is set by an operation (pressing) of the user performed on input device 400. In a case where test start button TSS1 is pressed, server device 300 receives the counting result of the number of persons who pass through the person counting area and the captured images in a case where a walking test in which one or more persons actually pass through the person counting area within the imaging area of the camera device for which the person counting area is set is executed.

Test result button TSR1 is a button for displaying the result (for example, statistical result) of the walking test as a visual graph by an operation (pressing) of the user performed on input device 400. In a case where test result button TSR1 is pressed, server device 300 generates the statistical result (for example, the counting result of the number of persons who pass through the person counting area in each time zone) based on the counting result transmitted from the camera device, as the result of the walking test, and displays the generated statistical result as a graph (for example, see FIG. 8).

Input field PRI1 of parameter P1 is a field in which parameter P1 (for example, the minimum number of pixels recognized as one person on the captured image) corresponding to a value of a height selected in a case where the person counting area is set is input as a threshold.

Threshold setting button STF1 is a button used for confirming a value of the threshold input in input field PRI1. In a case where threshold setting button STF1 is pressed, server device 300 sets the value of the threshold input in input field PRI1 as a confirmation value of parameter P1 (for example, the minimum number of pixels recognized as a person on the captured image).

Checkbox CRB1 is a button used for selecting one or more camera devices as a walking test target. In a case where test execution button TSE1 of the selected cameras is pressed for the camera device selected by checkbox CRB1, the process of server device 300 in a case where the walking test is collectively executed is performed similarly to a case where test start button TSS1 is pressed.

Test result collective export button EXP2 is used for exporting the statistical results (test results) generated by server device 300 based on the counting results of one or more camera devices on which the walking test is executed.

Line and mask easy setting screen STG1 shown in FIG. 5 is a screen for allowing the user who uses input device 400 to easily set the person counting area. The line and mask easy setting screen is generated by display information generator 350, and is displayed on monitor 450. In FIG. 5, in order to set the person counting area (for example, line), a display area of captured image LNG1 of the camera device, height input filed HG1, height setting button STH1, a plurality of control boxes LR1, LR2, LR3, LR4, LR5, LR6, LR7, and LR8, line automatic generation button LDW1, line position setting button STL1, line image output button LGP1, door checkbox DR1, and mask generation button MSK1 are displayed.

A height (camera height) of the camera device is input in height input field HG1. For example, 3.0 m (meters) is input as a height from a floor in FIG. 5. A size of the person within the captured image of the camera device is changed depending on the height of the camera device. In other words, since the size (more specifically, the number of pixels) recognized as the person by the camera device varies depending on the height of the camera device, in a case where the size recognized as the person is not appropriately set, detection accuracy of the person is changed. In the present exemplary embodiment, the height (for example, 3 m (meters)) of the camera device and the size (for example, 100 pixels) recognized as the person by the camera device are associated with each other.

Height setting button STH1 is used for confirming and setting the value input in height input field HG1, as the height of the camera device through an easy operation of the user who uses input device 400. The information of the set height is generated as data of the information (parameter) regarding the person counting area by display information generator 350, and is stored in analysis result accumulator 345.

A plurality of control boxes LR1, LR2, LR3, LR4, LR4, LR5, LR6, LR7, and LR8 is used for designating the position or direction of the gate (for example, automatic door DOR installed in the boundary between the outside of the store and the inside of the store) pictured within captured image LNG1 of the camera device. Since automatic door DOR is pictured on a lower side of FIG. 5 of captured image LNG1 of the camera device in FIG. 5, control box LR7 indicating the position or direction on the lower side of FIG. 5 is selected by an operation of the user who uses input device 400.

Line automatic generation button LDW1 is used for drawing the person counting area (in this example, line) so as to be superimposed on captured image LNG1 of the camera device by selecting any control box. In a case where any control box is selected and line automatic generation button LDW1 is pressed, display information generator 350 displays line LNE having the substantially same length as that of the gate (for example, automatic door DOR) pictured in the position or direction of the selected control box so as to draw this line near the gate. For example, line LNE has the same length as that of the aisle within the store along which a visiting customer who passes through automatic door DOR walks or the same length as the width of the automatic door DOR in FIG. 5. Since captured image LNG1 is captured by the camera device (for example, omnidirectional camera), the captured image is distorted toward the peripheral portion from the center. Accordingly, it is difficult to ascertain sense of distance between the length of automatic door DOR and the length of line LNE, automatic door DOR and line LNE have the substantially same length. An image of line LNE may include a character image indicating a passing direction. For example, a character image of "IN" indicating that the person passes through automatic door DOR and goes in the store and an arrow image indicating a direction in which the person goes in the store are represented as the image of line LNE. Similarly, a character image of "OUT" indicating that the person passes through automatic door DOR and goes out of the store and an arrow image indicating a direction in which the person goes out of the store are represented as the image of line LNE. Although the number of lines to be drawn is set as one, two or three or more lines may be set by an operation of the user who uses input device 400 on the setting screen (not shown).

Line position setting button STL1 is used for confirming the image (see above) of line LNE generated by pressing line automatic generation button LDW1. In a case where line position setting button STL1 is pressed, display information generator 350 confirms and sets positional information of line LNE within the viewing angle (that is, captured image). The set positional information of line LNE is generated as the data of the information (parameter) regarding the person counting area in association with the information of the height by display information generator 350, and is stored in analysis result accumulator 345.

Line image output button LGP1 is used for storing the image (see above) of line LNE generated by pressing line automatic generation button LDW1, as line image data. In a case where line image output button LGP1 is pressed, display information generator 350 stores the line image data in analysis result accumulator 345.

Door checkbox DR1 and mask generation button MSK1 are used for generating the person counting areas (for example, the person detection area and the mask area).

For example, in a case where there is a door (an example of the gate) such as automatic door DOR within the viewing angle of the camera device, door checkbox DR1 is selected for displaying door mask area DMSK1 shown in FIG. 6, as an example of the person counting area. In a case where door checkbox DR1 is selected and mask generation button MSK1 is pressed, display information generator 350 displays line and mask detail setting screen STG2 displayed by superimposing door mask area DMSK1 and person detection area CMSK1 as examples of the person counting area on captured image LNG1 (see FIG. 6).

Mask generation button MSK1 is a button used for generating person detection area CMSK1 (that is, an area having a predetermined shape formed near line LNE in order to effectively count the number of persons who pass through line LNE) as an example of the person counting area regardless of whether or not there is the door (an example of the gate) such as automatic door DOR within the viewing angle of the camera device. In a case where mask generation button MSK1 is pressed, display information generator 350 displays line and mask detail setting screen STG2 displayed by superimposing person detection area CMSK1 as an example of the person counting area on captured image LNG1 (see FIG. 6).

Line and mask detail setting screen STG2 shown in FIG. 6 is a screen for allowing the user who uses input device 400 to set the person counting area in detail. The line and mask detail setting screen is generated by display information generator 350, and is displayed on monitor 450. In FIG. 6, various buttons for adjusting (modifying) or removing the person counting areas (for example, line LNE, person detection area CMSK1, and door mask area DMSK1) and the positions of the person counting areas are displayed. For example, EasyMask button BT0, line drawing button BT1, rectangle drawing button BT2, polygon drawing button BT3, rectangle drawing button BT4, polygon drawing button BT5, line selection button BT6, person detection area selection button BT7, mask area selection button BT8, delete button BT9, delete-all button BT10 are displayed as various buttons.

Line LNE indicates a line automatically generated by pressing line automatic generation button LDW1 of line and mask easy setting screen STG1 or a line of which a position is adjusted (modified) by various buttons to be described below. As stated above, the width of line LNE is set to the same width as the width of automatic door DOR in order to accurately count the number of persons who pass through line LNE without any loss. In other words, the width of line LNE is set such that the number of persons who go around line LNE without crossing over this line is excluded from a counting target.

Person detection area CMSK1 indicates a person detection area generated by pressing mask generation button MSK1 of line and mask easy setting screen STG1 or a person detection area of which a position is adjusted (modified) by various buttons to be described below. As stated above, person detection area CMSK1 includes an area having a predetermined shape including the width of line LNE in order to accurately count the number of persons who pass through line LNE, and the number of persons who pass through line LNE within this area is counted by the camera device.

Door mask area DMSK1 indicates a door mask area (an example of the mask area) that covers automatic door DOR which is generated by selecting door checkbox DR1 of line and mask easy setting screen STG1 and pressing mask generation button MSK1 or a door mask area (an example of the mask area) of which a position is adjusted (modified) by various buttons to be described below. Door mask area DMSK1 has a predetermined width capable of covering an area near the moving object (in this example, automatic door DOR) other than the person such that automatic door DOR that is opened or closed (that is, moves) whenever the person approaches is excluded from a counting target of the camera device. In other words, the person who appears in door mask area DMSK1 is omitted from a person counting target of the camera device.

In a case where EasyMask button BT0 is pressed through an easy operation of the user who uses input device 400, person detection area CMSK1 is displayed by display information generator 350 so as to cover the entire line LNE.

Line drawing button BT1 is used in a case where display information generator 350 draws a line on captured image LNG1 within line and mask detail setting screen STG2 through an easy operation of the user who uses input device 400.

Rectangle drawing button BT2 is used in a case where display information generator 350 draws a rectangular person detection area on captured image LNG1 within line and mask detail setting screen STG2 through an easy operation of the user who uses input device 400.

Polygon drawing button BT3 is used in a case where display information generator 350 draws a polygonal person detection area on captured image LNG1 within line and mask detail setting screen STG2 through an easy operation of the user who uses input device 400.

Rectangle drawing button BT4 is used in a case where display information generator 350 draws a rectangular mask area (for example, door mask area DMSK1) on captured image LNG1 within line and mask detail setting screen STG2 through an easy operation of the user who uses input device 400.

Polygon drawing button BT5 is used in a case where display information generator 350 draws a polygonal mask area (for example, door mask area DMSK1) on captured image LNG1 within line and mask detail setting screen STG2 through an easy operation of the user who uses input device 400.

Line selection button BT6 is pressed in a case where display information generator 350 adjusts (modifies) the position of the line drawn on captured image LNG1 within line and mask detail setting screen STG2 through an easy operation of the user who uses input device 400, and the position of the line is adjusted (modified) through an operation (specifically, dragging operation) of the user who uses input device 400 after the line selection button is pressed.

Person detection area selection button BT7 is pressed in a case where display information generator 350 adjusts (modifies) the position of the person detection area drawn on captured image LNG1 within line and mask detail setting screen STG2 through an easy operation of the user who uses input device 400, and the position of the person detection area is adjusted (modified) through an operation (specifically, dragging operation) of the user who uses input device 400 after the person detection area selection button is pressed.

Mask area selection button BT8 is pressed in a case where display information generator 350 adjusts (modifies) the position of the mask area drawn on captured image LNG1 within line and mask detail setting screen STG2 through an easy operation of the user who uses input device 400, and the position of the mask area is adjusted (modified) through an operation (specifically, dragging operation) of the user who uses input device 400 after the mask area selection button is pressed.

Delete button BT9 is pressed in a case where display information generator 350 deletes any of the line, the person detection area, and the mask area drawn on captured image LNG1 within line and mask detail setting screen STG2 through an easy operation of the user who uses input device 400, and any of the line, the person detection area, and the mask area selected through an operation (specifically, dragging operation) of the user who uses input device 400 is deleted after the delete button is pressed.

Delete-all button BT10 is pressed in a case where display information generator 350 deletes all the line, the person detection area, and the mask area drawn on captured image LNG1 within line and mask detail setting screen STG2 through an easy operation of the user who uses input device 400, and all the drawn line, person detection area, and mask area are deleted after the delete-all button is pressed.

As mentioned above, the positional information of person detection area CMSK1 or door mask area DMSK1 set by line and mask easy setting screen STG1 shown in FIG. 5 and line and mask detail setting screen STG2 shown in FIG. 6 is generated as the data of the information (parameter) regarding the person counting area in association with the information of the height and the positional information of the line by display information generator 350, and is stored in analysis result accumulator 345.

Figure 7:
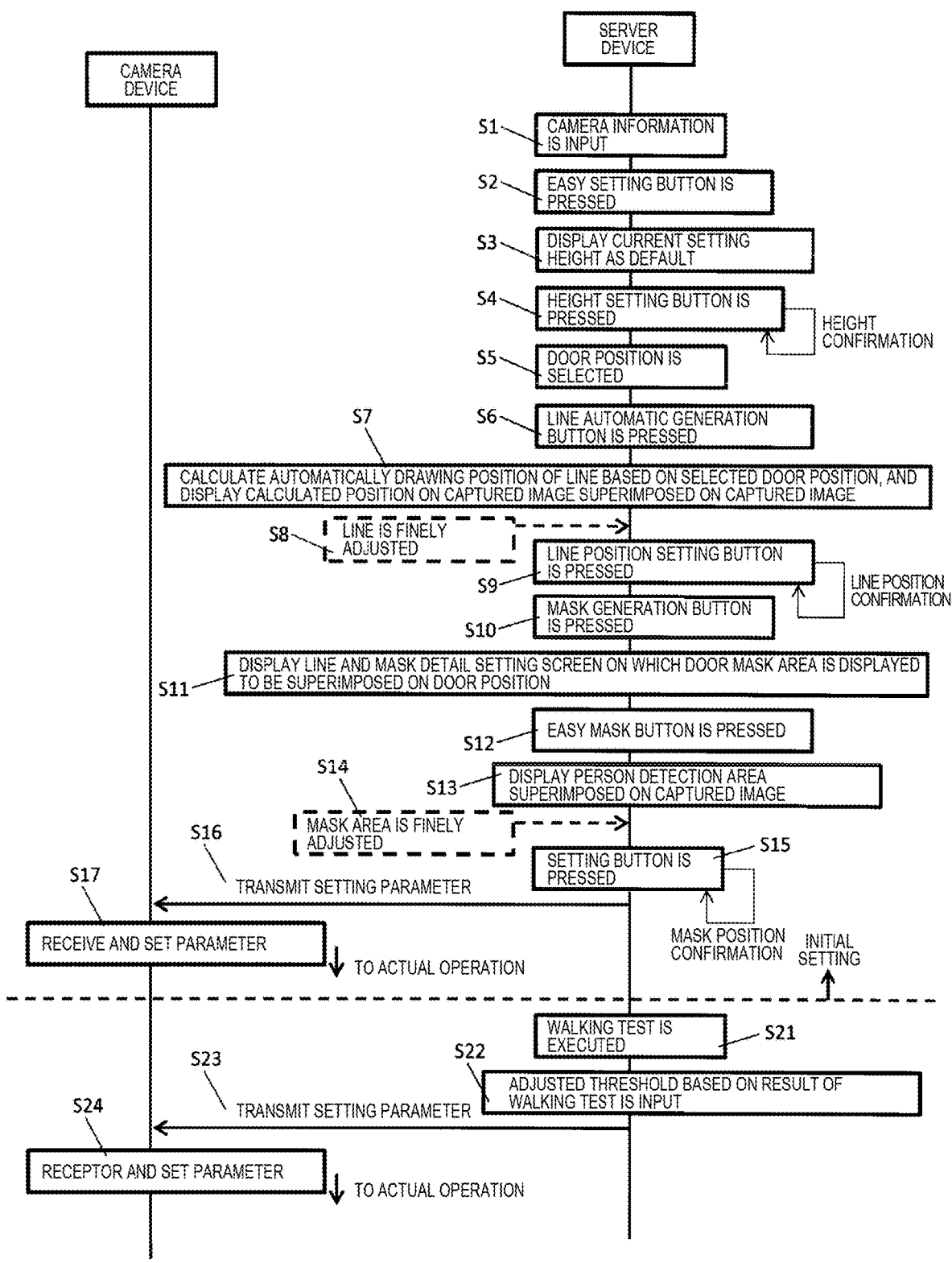
FIG. 7 is a sequence diagram for describing an example of a process procedure related to the setting of a line and a mask on a captured image which is performed between the server device and the camera device according to the present exemplary embodiment.

Hereinafter, an example of a process procedure related to the setting of the line and the mask on the captured image which is performed between server device 300 and camera device 100 according to the present exemplary embodiment will be described with reference to FIG. 7. FIG. 7 is a sequence diagram for describing an example of the process procedure related to the setting of the line and the mask on captured image LNG1 which is performed between server device 300 and camera device 100 according to the present exemplary embodiment.

In FIG. 7, display information generator 350 displays camera information setting screen STG0 shown in FIG. 4 on monitor 450. For example, in a case where necessary camera information is input in input field IFD1 of the corresponding camera device of camera information setting screen STG0 shown in FIG. 4 through an easy operation of the user who uses input device 400 (S1), display information generator 350 displays the input camera information in input field IFD1.

Subsequently, in a case where easy setting button EST1 corresponding to the corresponding camera device within camera information setting screen STG0 is pressed through an easy operation of the user who uses input device 400 (S2), display information generator 350 displays line and mask easy setting screen STG1 shown in FIG. 5 on monitor 450. The value of the height of the currently set camera device is displayed as a default value in height input field HG1 of line and mask easy setting screen STG1 (S3).

In a case where height setting button STH1 is pressed in a state in which a new value or a currently displayed value is input in height input field HG1 through an easy operation of the user who uses input device 400 on line and mask easy setting screen STG1 (S4), display information generator 350 confirms the height of the camera device, as the information (parameter) regarding the person detection area.

Thereafter, in a case where the gate (for example, automatic door DOR) is pictured on captured image LNG1 of the camera device displayed on line and mask easy setting screen STG1, any control box is selected as the position of automatic door DOR among the plurality of control boxes LR1 to LR8 through an easy operation of the user who uses input device 400 (S5).

In a case where line automatic generation button LDW1 is pressed through an easy operation of the user who uses input device 400 after step S5 (S6), display information generator 350 displays line LNE having the substantially same length as that of the gate (for example, automatic door DOR) pictured in the position or direction of the control box selected in step S5, as drawing (that is, which is superimposed on imaging image LNG1) near the gate based on the position or direction thereof (S7). A drawing position of line LNE is calculated by display information generator 350. For example, line LNE is drawn in a position separated from automatic door DOR by a predetermined distance. Information regarding the predetermined distance is referred to in the calculating of display information generator 350.

For example, in a case where line and mask detail setting screen STG2 is displayed on monitor 450 and the position of line LNE drawn in step S7 is finely adjusted through an easy operation of the user who uses input device 400 (S8), display information generator 350 retains the finely adjusted position of line LNE in a memory (not shown).

In a case where line position setting button STL1 is pressed by an easy operation of the user who uses input device 400 after step S7 or step S8 (S9), display information generator 350 confirms and sets the positional information line LNE within the viewing angle (that is, captured image), as the information (parameter) regarding the person detection area.

Subsequently, in a case where door checkbox DR1 of line and mask easy setting screen STG1 is selected and mask generation button MSK1 is pressed through an easy operation of the user who uses input device 400 (S10), display information generator 350 displays line and mask detail setting screen STG2 displayed by superimposing person detection area CMSK1 and door mask area DMSK1 as examples of the person counting area on captured image LNG1 (S11, see FIG. 6).

In a case where EasyMask button BT0 is pressed through an easy operation of the user who uses input device 400 (S12), display information generator 350 displays person detection area CMSK1 as an example of person counting area so as to be superimposed on captured image LNG1 of line and mask detail setting screen STG2 such that the entire line LNE is covered (S13).

In a case where the position or shape of door mask area DMSK1 or person detection area CMSK1 displayed in step S13 is finely adjusted through an easy operation of the user who uses input device 400 (S14), display information generator 350 retains the finely adjusted position of door mask area DMSK1 or person detection area CMSK1 in a memory (not shown).

In a case where a setting button (not shown on line and mask detail setting screen STG2 shown in FIG. 6) is pressed through an easy operation of the user who uses input device 400 after step S13 or step S14 (S15), display information generator 350 confirms and sets positional information of door mask area DMSK1 or person detection area CMSK1 within the viewing angle (that is, captured image), as the information (parameter) regarding the person detection area.

Parameter notifier 370 of server device 300 notifies camera device 100 of the information (parameter) regarding the person counting area set in step S15 (S16). For example, the information (parameter) regarding the person counting area is positional information of line LNE within the viewing angle (that is, captured image) or positional information of door mask area DMSK1 or person detection area CMSK1, and is received by parameter receptor 80 of camera device 100. Parameter setter 90 of camera device 100 writes and sets the information (parameter, see above) regarding the person counting area received by parameter receptor 80 in parameter storage 45 (S17). Accordingly, initial setting of the information regarding the person counting area for camera device 100 is completed. That is, an actual operation for counting the number of persons is started. In this operation, the number of persons who pass through line LNE within person detection area CMSK1 for captured image LNG1 of camera device 100 is counted, and the persons within door mask area DMSK1 are omitted from the counting target.

Before the actual operation is started after the initial setting is performed, a walking test in which one or more tested persons (for example, contractors of camera device 100 or employees of the store) actually walk around line LNE, person detection area CMSK1, or door mask area DMSK1 within the viewing angle of camera device 100 is executed (S21). For example, the start of the walking test is designated by pressing test start button TSS1 of camera information setting screen STG0 through an easy operation of the user who uses input device 400.

Figure 8:
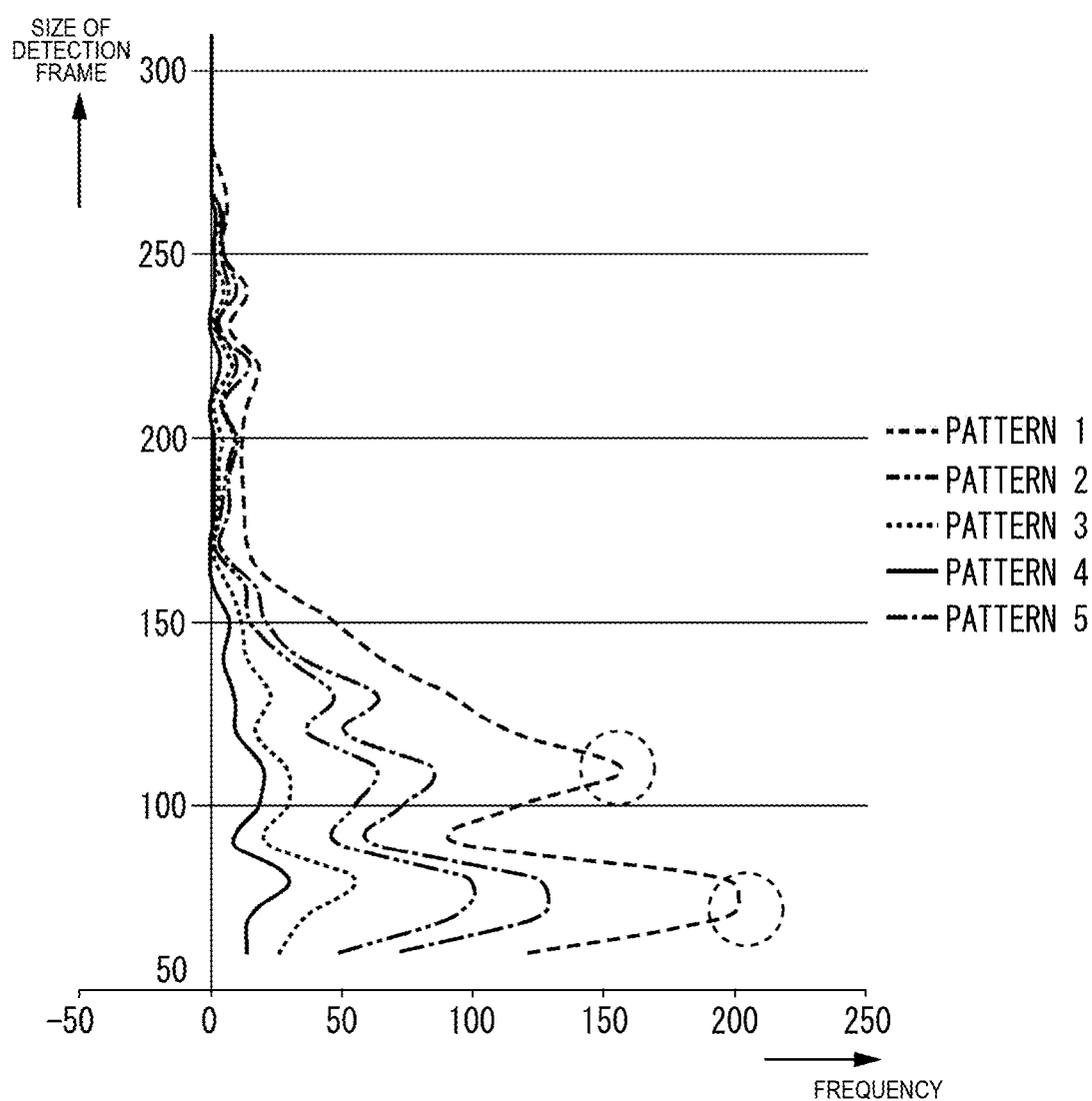
FIG. 8 is a diagram showing an example of an analysis result of the number of persons who pass through a line through a walking test after initial setting is performed.

Reception information analyzer 380 generates the data of the analysis result shown in FIG. 8 by using the data of the counting result of the number of persons who pass the person counting area (specifically, line LNE within person detection area CMSK1) of the transmission target data transmitted from camera device 100 during the walking test. Display information generator 350 generates a graph visually showing the data of the analysis result generated by reception information analyzer 380, and displays the generated graph on monitor 450. Accordingly, the threshold (for example, parameter P1 shown in FIG. 4) adjusted based on the result of the walking test is input in input field PRI1 of camera information setting screen STG0 through the determination of the user who visually checks the graph shown in FIG. 8 (S22).

After step S22, parameter notifier 370 of server device 300 notifies camera device 100 of the information (parameter) regarding the person counting area including the threshold set in step S22 (S23). For example, the information (parameter) regarding the person counting area is the threshold adjusted in step S22, the positional information of line LNE within the viewing angle (that is, captured image), or the positional information of person detection area CMSK1 or door mask area DMSK1, and is received by parameter receptor 80 of camera device 100. Parameter setter 90 of camera device 100 writes and sets the information (parameter, see above) regarding the person counting area received by parameter receptor 80 in parameter storage 45 (S24). Accordingly, the setting after the walking test of the information regarding the person counting area for camera device 100 is completed. That is, an actual operation for counting the number of persons is started. In this operation, the number of persons who pass through line LNE within person detection area CMSK1 for captured image LNG1 of camera device 100 is counted, and the persons within door mask area DMSK1 are omitted from the counting target.

FIG. 8 is a diagram showing an example of the analysis result of the number of persons who pass through the line through the walking test after the initial setting is performed. A horizontal axis of FIG. 8 represents frequency, and a vertical axis of FIG. 8 represents a size (that is, a size of a person frame in a case where the camera device detects the person who appears within the captured image) of a detection frame of the person. From FIG. 8, a size of a detection frame having high frequency is set as the threshold (parameter P1).

Patterns 1 to 5 represent patterns of the way that the tested person walks during the walking test. For example, Pattern 1 is a pattern of the way that the tested person goes in the shop through automatic door DOR and goes straight, Pattern 2 is a pattern of the way that the tested person goes in the store through automatic door DOR and goes diagonally to the right, Pattern 3 is a pattern of the way that the tested person goes in the store through automatic door DOR and goes diagonally to the left, Pattern 4 is a pattern of the way that the tested person goes straight toward automatic door DOR from the inside of the store, and Pattern 5 is a pattern of the way that the tested person goes diagonally to the left toward automatic door DOR from the inside of the store. In FIG. 8, since a peak value in frequency appears in the size of the same detection frame in all the patterns, a value of the vertical axis in this case is set as the threshold (that is, parameter P1).

For example, it is necessary to appropriately set a parameter indicating the size recognized as the person in order to accurately perform a process of counting the number of persons in camera device 100. An optimum value of the parameter is not necessarily a value determined in the same way. For example, since the way that a shadow is created is different between a case where the lighting is spot lighting and a case where the lighting is a fluorescent lamp, it is necessary to change the parameter depending on the way that the shadow is created. Alternatively, since brightness varies depending on whether or not external light easily enters, it is also necessary to change the parameter depending on the brightness. Accordingly, it is necessary to set an optimum parameter depending on an installation environment, but it is difficult for a person other than a skilled technician to set the parameter. In a case where the optimum parameter is not set, maximum accuracy is not able to be acquired.

In the present exemplary embodiment, reception information analyzer 380 of server device 300 generates the analysis result shown in FIG. 8 by using the counting result of the number of persons in each pattern acquired from camera device 100 as the result of the walking test, and display information generator 350 of server device 300 displays the analysis result on monitor 450. Accordingly, even a general user other than the skilled technician can determine the optimum parameter depending on the installation environment. The optimum parameter value may be determined by the user or may be automatically performed (for example, is extracted by reception information analyzer 380 of server device 300).

Figure 9:
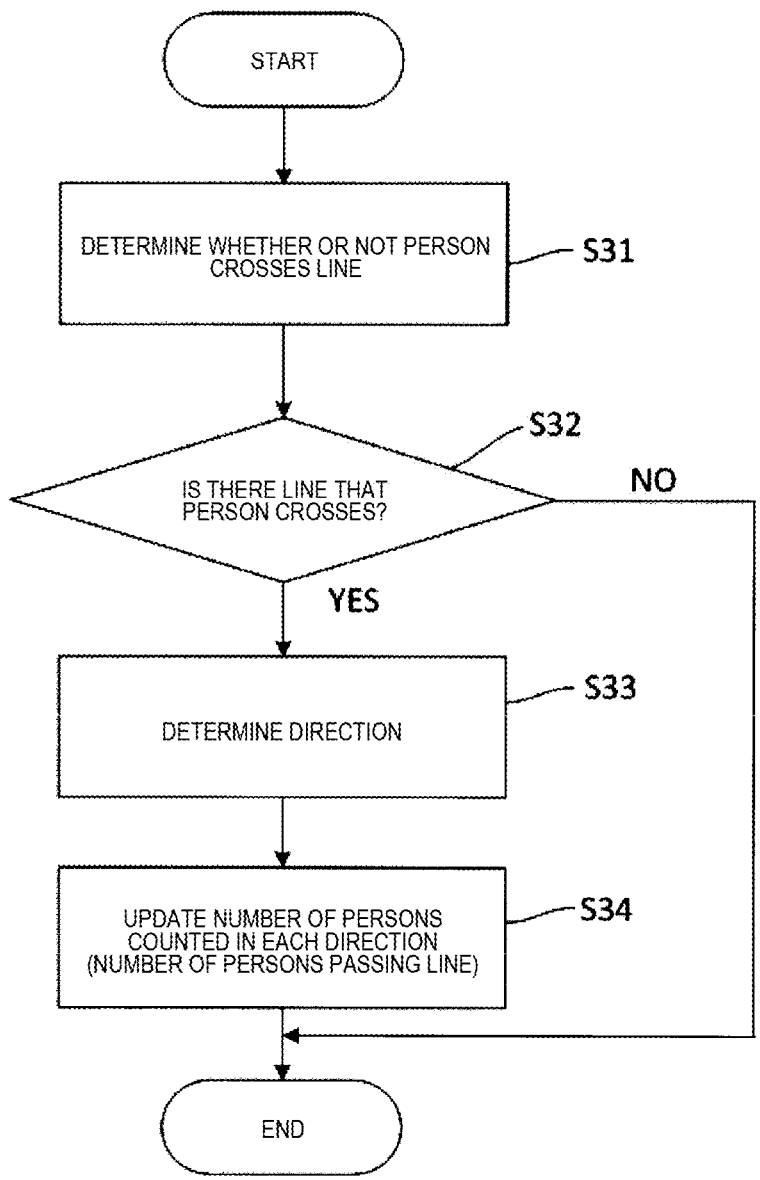
FIG. 9 is a flowchart for describing an example of a process procedure of counting the number of persons who pass through the line in each direction at the time of an actual operation.

FIG. 9 is a flowchart for describing an example of a process procedure of counting the number of persons who pass through line LNE in each direction at the time of the actual operation. Passing and staying determiner 33 of camera device 100 performs the process of counting the number of persons shown in FIG. 9 for line LNE. Passing and staying determiner 33 determines that the person crosses and passes through the line for setting line LNE (S31). The determination of whether or not the person crosses line LNE may be performed by passing and staying determiner 33 from coordinates of moving line tracking of the person based on processing results acquired by performing person detection in target detector 31 and moving object tracking in moving line analyzer 32.

Passing and staying determiner 33 determines whether or not the person crosses line LNE (S32). In a case where the person crosses line LNE (S32, YES), the passing and staying determiner determines a direction in which the person crosses the line (S33). Meanwhile, in a case where the person does not cross line LNE (S32, NO), the process shown in FIG. 9 is ended.

Subsequently, passing and staying determiner 33 updates (increases) a value (that is, the number of persons crossing line LNE) of the number of persons in each direction (one by one) (S34). Passing and staying determiner 33 outputs the counting result of the number of persons in each direction to server device 300 through transmitter 60. Server device 300 adds the counting result (the number of persons passing through the line) corresponding to line LNE to the moving line analysis image, and displays the resultant image on monitor 450.

Figure 10:
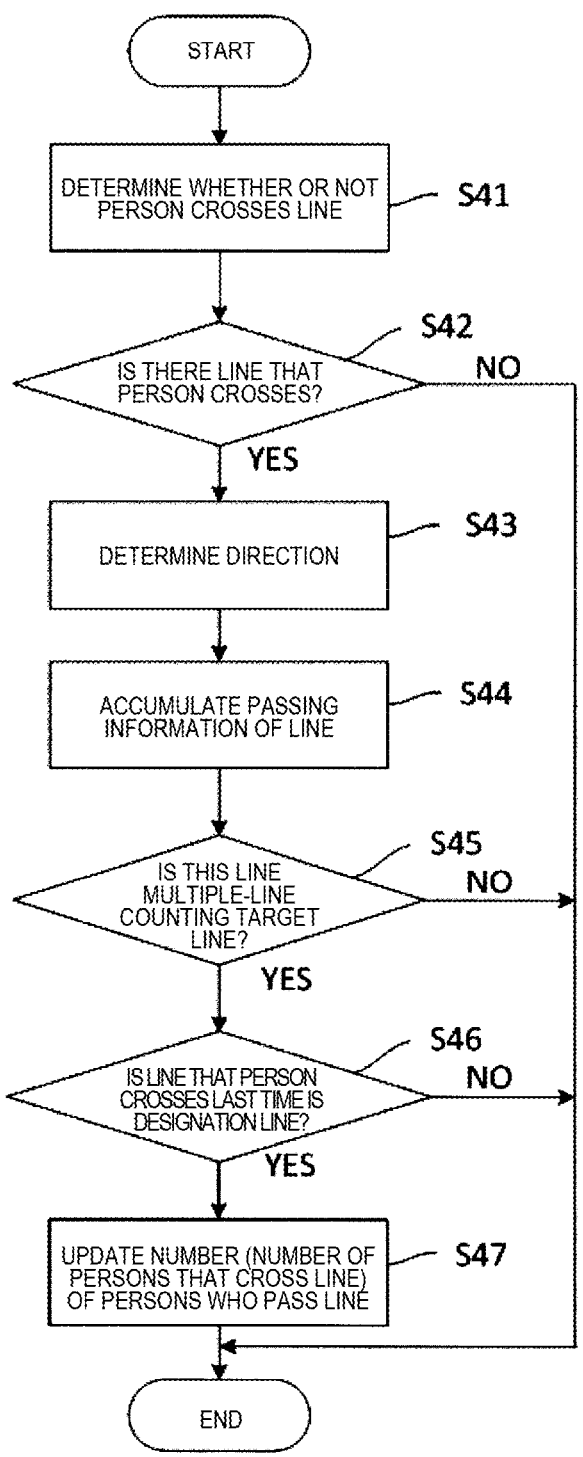
FIG. 10 is a flowchart for describing an example of a process procedure of counting the number of persons who pass through a plurality of lines at the time of the actual operation.

FIG. 10 is a flowchart for describing an example of a process procedure of counting the number of persons who pass through multiple lines LNE at the time of the actual operation. Passing and staying determiner 33 of camera device 100 performs the process of counting the number of persons shown in FIG. 10 on the multiple (for example, two) lines only by the number of lines. Passing and staying determiner 33 determines that the persons cross and pass through the line for each line set within captured image LNG1 (S41). Passing and staying determiner 33 determines whether or not the person crosses the line (S42). In a case where the person crosses the line (S42, YES), the passing and staying determiner determines a direction in which the person crosses the line (S43). Passing and staying determiner 33 accumulates passing information of the line in moving line analysis information accumulator 40 (S44). Passing and staying determiner 33 accumulates the number of persons passing through the line and ID information of the line such as a line number, as passing information indicating a line that the person crosses.

Thereafter, passing and staying determiner 33 determines whether or not the line is a multiple-line counting target line for which the number of persons who cross multiple lines is counted (S45). In a case where the line is the multiple-line counting target line (S45, YES), the passing and staying determiner 33 determines whether or not the line that the person crosses in last time is a predetermined designation line (S46). As for the setting of the line, multiple (for example, two) lines are set as the multiple-line counting target line, and one line is set as the predetermined designation line. In this case, in a case where the line that the person crosses this time is any multiple-line counting target line and the line that the person crosses last time is the predetermined designation line, the determination processes of step S45 and S46 are YES. In a case where the line that the person crosses last time is the predetermined designation line in step S46 (S46, YES), the number (the number of persons crossing the line) of persons crossing the multiple lines (the multiple-line counting target line and the predetermined designation line) is updated (increased one by one) (S47). Passing and staying determiner 33 transmits the counting result (information of the number of persons) of the number of persons passing through the multiple lines to server device 300 through transmitter 60. Server device 300 receives the counting result corresponding to the line, generates the resultant image by adding the received counting result to the moving line analysis image, and displays the generated resultant image on monitor 450.

Figure 11:
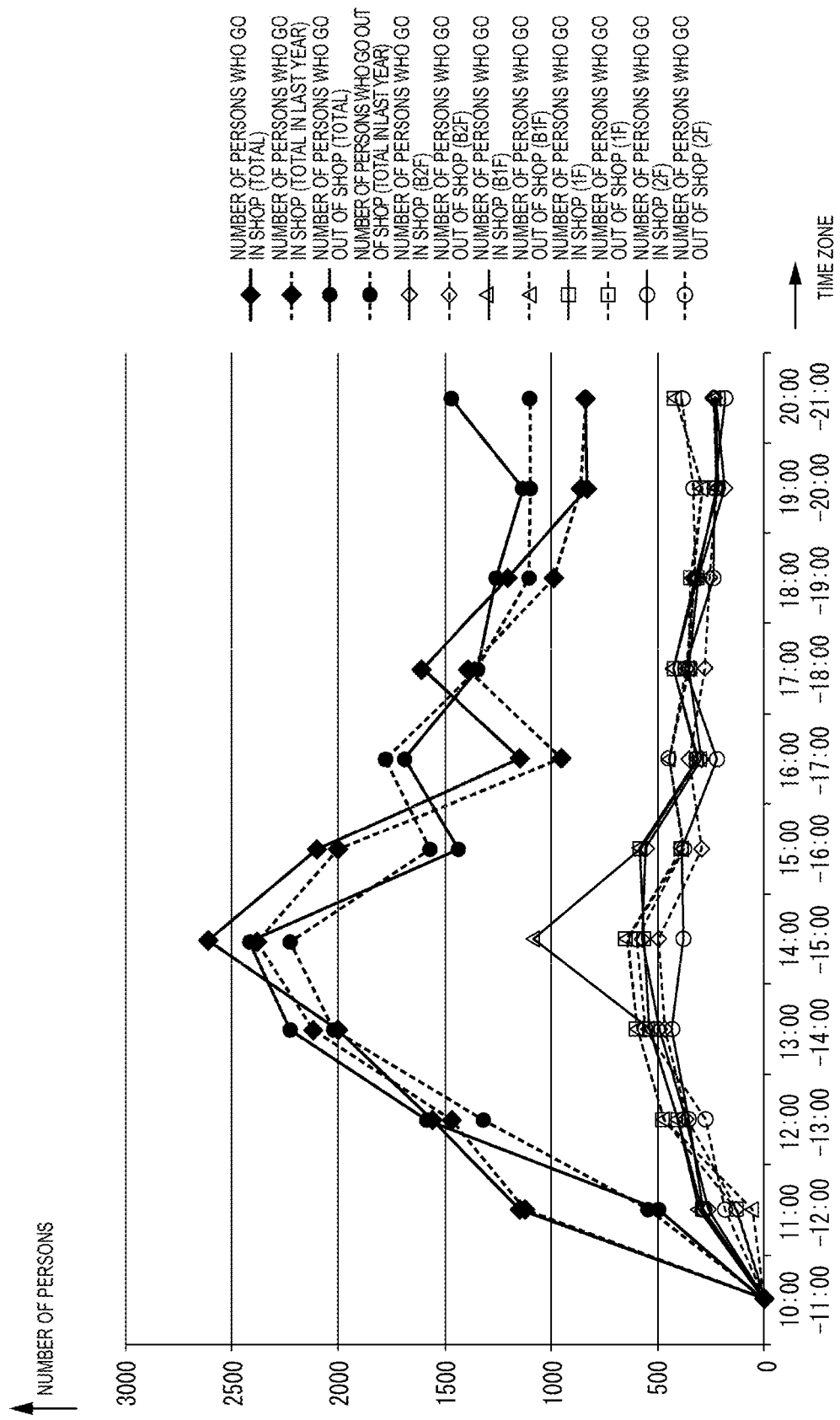
FIG. 11 is a diagram showing an example of a change in the number of persons who go in a shop or the number of persons who go out of the shop on each floor or all floors of store A in each time zone.

FIG. 11 is a diagram showing an example a change in the number of persons who go in the shop and a change in the number of persons who go out of the shop on each floor and all floors of store A in each time zone. A horizontal axis of FIG. 11 represents a time zone (for example, one hour), and a vertical axis of FIG. 11 represents a total value of the number of persons who pass through the person counting area which is counted by the camera device in each time zone. Reception information analyzer 380 acquires the change in the number of persons in each time by using the transmission target data (that is, the data of the counting result of the number of persons who pass through the person counting area) stored in reception information accumulator 340. A graph shown in FIG. 11 is generated by display information generator 350 based on the analysis result of reception information analyzer 380 and is displayed on monitor 450.

In FIG. 11, changes in the counting results for every hour from 10:00 which is a store opening time to 21:00 which is a shop closing time in the number of persons who go in the shop (total), the number of persons who go in the shop (total in last year), the number of persons who go out of the shop (total), the number of persons who go out of the shop (total in last year), the number of persons who go in the shop (B2F: second basement floor), the number of persons who go out of the shop (B2F: second basement floor), the number of persons who go in the shop (B1F: first basement floor), the number of persons who go out of the shop (B1F: first basement floor), the number of persons who go in the shop (1F: first floor), the number of persons who go out of the shop (1F: first floor), the number of persons who go in the shop (2F: second floor), the number of persons who go out of the shop (2F: second floor). For example, FIG. 11 shows that many housewives go in or go out of the shop from 14:00 to 15:00 during which a limited-time sale for side dishes of the dinner is performed. Accordingly, the person counting area including line LNE is appropriately set within the viewing angle of the camera device, and thus, indices related to an efficient operation of the store are acquired. Therefore, the indices can contribute to the marketing analysis task of the salesperson. Since the flow of the visiting customers between the shops can be ascertained, it is possible to efficiently examine the layout of which shops are arranged so as to be adjacent to or near popular shops.

FIG. 12 is a diagram showing an example of an operation screen including the moving line analysis image of store A generated by the display image generator of the server device. The operation screen shown in FIG. 12 is displayed on monitor 450 by display information generator 350.

On the operation screen shown in FIG. 12, a list of selection screens of the camera devices installed within the store is hierarchically displayed in left display area L1. For example, northern gate camera C1A (identification number: C1), northern gate camera C1B (identification number: C2), checkout counter ahead camera C2A (identification number: C3), checkout counter ahead camera C2B (identification number: C4), vegetable shop camera C6 (identification number: C5), fish shop camera C5 (identification number: C6), meat shop camera C4 (identification number: C7), and special sale camera C3 (identification number: C8) are hierarchically displayed in a grocery shop (identification number: G1) of floor 1 (1F). The same is true of other shops such as a clothing shop of floor 2 (2F), and thus, the description thereof will be omitted.

On the operation screen shown in FIG. 12, display area MA1 of main (for example, current) moving line analysis information and display area CE1 of sub (for example, comparison) moving line analysis information are displayed in right display area R1.

Designation condition display area MA1a including a designation time (including year, month, and date) when server device 300 generates a moving line analysis image of a browsing target, a statistical period indicating, for example, a half-day basis, one day basis, one week basis, or one month, and a selection screen of the camera devices for each shop selected in display area L1, and moving line analysis result display area MA1b including video display classification of the moving line analysis image, graph display classification, graph display group (G), and display area CT1 of the number of visiting customers for each shop are displayed in display area MA1 of the moving line analysis information.

The video display classification of the moving line analysis image includes a staying map on which staying information of the persons shown in FIG. 12 is represented, a count map on which passing information of the persons is represented, and the captured image. The number of persons detected by passing and staying determiner 33 in a sequence of time (for example, for every hour in FIG. 12) is represented in display area CT1 of the number of visiting customers for each shop. For example, in a case where input device 400 shifts selection bar KR displayed in display area CT1 of the number of visiting customers for each shop in a time axis direction by an input operation of the user, display information generator 350 sequentially displays the moving line analysis images generated in the time indicated by selection bar KR.

Similarly, designation condition display area CE1a including a designation time (including year, month, and date) when server device 300 generates the moving line analysis image of the browsing target, as the comparison target of display area MA1 of the main moving line analysis information, a statistical period indicating, for example, a half-day basis, one day basis, one week basis, or one month basis, and a selection screen of the camera devices for each shop selected in display area MA1 of the main moving line analysis information and moving line analysis result display area CE1b including video display classification of the moving line analysis image, graph display classification, graph display G (group), and display area CT2 of the number of visiting customers for each shop are displayed in display area CE1 of the sub moving line analysis information. For example, in a case where display area CE1 of the sub moving line analysis information is used, the sub moving line analysis information is used for comparison between before and after a discount sticker is attached to a product, comparison between before and after the limited-time sale is performed, comparison between today and the same day a year ago, and comparison between the stores (for example, comparison between a meat shop of store A and a meat shop of store B) in addition to the comparison before and after the layout within the store is changed.

The number of persons detected by passing and staying determiner 33 in a sequence of time (for example, for every hour in FIG. 12) is represented in display area CT2 of the number of visiting customers for each shop. For example, in a case where input device 400 shifts selection bar KR displayed in display area CT2 of the number of visiting customers for each shop by an input operation of the user, display information generator 350 sequentially reproduces and displays the moving line analysis images generated in the time indicated by selection bar KR.

Input device 400 may designate a specific time zone on the time axis and may input a comment (for example, limited-time sale, 3F event, TV broadcasting, or game at an adjacent dome) by an input operation of the user in display area CT1 of the number of visiting customers for each shop of display area MA1 of the main (for example, current) moving line analysis information and in display area CT2 of the number of visiting customers for each shop of display area CE1 of the sub (for example, comparison example) moving line analysis information.

FIG. 13 is a diagram showing an example of an operation screen of the monthly report in the grocery shop of store A on May 2014 which is generated by the display image generator of the server device. In a case where report output button OPT provided on a lower side of left display area L1 of the operation screen shown in FIG. 12 is pressed by input device 400, the monthly report (see FIG. 13) as an example of the moving line analysis report according to the present exemplary embodiment is a screen which is generated by display information generator 350 and is displayed on monitor 450. Display information generator 350 of server device 300 may output the monthly report shown in FIG. 12 or information (for example, a monthly report in a meat shop of grocery shops) of a part thereof to a printer (not shown) installed in store A. Accordingly, the salesperson of store A receives printouts of monthly reports of all the grocery shops or the meat shop as a part thereof, and the printout includes the contents on which the moving line analysis image on which the visiting customers are not pictured is output.

Various information items regarding a title of the monthly report, information regarding a temperature, display area SR1 related to sales information, display area CR1 related to statistical information such as the number of visiting customers of the store (for example, store A), display areas of moving line analysis images HM5 and HM6 generated by display information generator 350 before and after the layout of shops as an example of the predetermined event is changed, and display areas CT5 and CT6 of the number of visiting customers for each shop are displayed on operation screen RPT of the monthly report (moving line analysis report) shown in FIG. 13. For example, various information items regarding a title of the monthly report, information regarding a temperature, sales information, event information, and information regarding visiting customers are transmitted to the server device (for example, server device 300) within the corresponding store (for example, store A) from server device 600 of the operation headquarter. Various information items regarding a title of the monthly report, information regarding a temperature, sales information, event information, and information regarding visiting customers may be previously stored in server device 300 within the store or a storage (not shown).

For example, similarly to the case of FIG. 12, in a case where input device 400 shifts selection bar KR displayed in display area CT5 or CT6 of the number of visiting customers for each shop in a time axis direction by an input operation of the user, display information generator 350 sequentially displays the moving line analysis images generated in the time indicated by selection bar KR on operation screen RPT of a monthly report shown in FIG. 13.

As mentioned above, in moving line analysis system 500A according to the present exemplary embodiment, one or more camera devices 100 and server device 300 are connected to each other, and server device 300 displays the captured image acquired by camera device 100 on monitor 450. In a case where positional information (first parameter) indicating the position of the gate (for example, automatic door DOR) pictured on the captured image displayed on monitor 450 is input, server device 300 generates the image (for example, the image of line LNE) of the person counting area for counting the number of one or more persons who pass through automatic door DOR and displays the generated image such that the generated image is superimposed on the captured image on monitor 450 based on the input positional information of automatic door DOR. Server device 300 transmits the information regarding the person counting area to camera device 100. Camera device 100 sets the information (parameter) regarding the person counting area transmitted from server device 300, counts the number of persons who pass the person counting area based on the person counting area set on the captured image, and transmits the captured image acquired for a predetermined period in association with the counting result of the number of persons who pass through the person counting area to server device 300.

Accordingly, according to moving line analysis system 500A according to the present exemplary embodiment, it is possible to easily set the person counting area within the captured image of camera device 100 regardless of whether or not the operator is an expert who has abundant experiences of a task for setting the person counting areas (for example, line LNE, person detection area CMSK1, and door mask area DMSK1). Accordingly, it is possible to improve usability of the operator.

In the present exemplary embodiment, server device 300 can output the set image of the person counting area and store the output image in analysis result accumulator 345 through an easy operation of the user who uses input device 400. For example, the image of the person counting area includes a character image (IN or OUT) indicating a direction (for example, an upper-lower direction or a left-right direction) in which line LNE is interposed. This image may be referred to in a case where the position of line LEN is appropriately determined after the initial setting (see FIG. 7). For example, in a case where a line is set between shops, the user who sets the line sees the actually captured image (captured image), and determines whether or not the position of line LNE is appropriate while checking a movement direction of the person. The image of line LNE including the character image can contribute to the referring in this case. The person in charge of the shopping mall (store) may perform the initial setting (see FIG. 7) of line LNE, and then may perform the walking test or the actual operation. The person in charge of the shopping mall may point out that accuracy in counting of the number of persons in camera device 100 is not better than expected to the contractor of camera device 100. In a case where there is the character image on the image of line LNE, the contractor may accurately determine whether or not camera device 100 is appropriately installed and the position of line LNE is appropriate.

Server device 300 displays line and mask easy setting screen STG1 on which a plurality of position selection icons (specifically, control boxes LR1 to LR8) for inputting the position of automatic door DOR near the captured image (captured image) is arranged on monitor 450. The position of automatic door DOR is input in response to the selection of any control box of the plurality of control boxes LR1 to LR8 through an easy operation of the user who uses input device 400. Accordingly, server device 300 can draw line LNE in an appropriate position (for example, near automatic door DOR) through an easy operation of the user who uses input device 400.

The person counting area includes at least one of line LNE for counting the number of persons who pass through automatic door DOR (gate), person detection area CMSK1 having a size of a first predetermined range including line LNE, and door mask area DMSK1 having a size of a second predetermined range including automatic door DOR (gate). Accordingly, it is possible to appropriately set person detection area CMSK1 which uses persons who pass through line LNE and a place near line LNE so as to cover line LNE, as the counting target and is capable of easily determining whether or not the person simply crosses the line and door mask area DMSK1 for omitting a steadily moved object (for example, automatic door DOR) from the person counting target, as the areas which are indices for counting the number of persons through an easy operation of the user who uses input device 400.

Through an easy operation of the user who uses input device 400, server device 300 generates a plurality of images for the person counting area, and displays the images of the person counting area such that the generated images are superimposed on the captured images on monitor 450. Accordingly, server device 300 can easily set the plurality of person counting areas such as line LNE, person detection area CMSK1, and door mask area DMSK1 for every person passing position noticed by the user.

In a case where the position for adjusting the position (for example, coordinates; an example of second parameter or coordinate) of the person counting area is input through an easy operation (for example, dragging operation) of the user who uses input device 400, server device 300 may update the position of the person counting area displayed so as to be superimposed on the captured image based on the input position (coordinates).

Camera device 100 according to the present exemplary embodiment is connected to server device 300, acquires the information regarding the person counting area for counting the number of one or more persons who pass through the gate (for example, automatic door DOR) pictured on the captured image of the imaging area from server device 300, and sets the person counting area on the captured image by using the acquired information regarding the person counting area. Camera device 100 counts the number of persons who pass through the person counting area based on the person counting area set on the captured image, and transmits the captured image acquired for a predetermined period in association with the counting result of the persons who pass through the person counting area to server device 300.

Accordingly, camera device 100 can accurately count the number of persons who pass through the person counting area set within the viewing angle (that is, an imaging range of the video), and can contribute to surveillance in the imaging area or marketing analysis based on the change in the number of persons.

While various exemplary embodiments have been described with reference to the drawings, the present disclosure is not intended to limit these examples. It is apparent to those skilled in the art that various changes or modifications may be made without departing from the scope described in the claims, and it should be understood that these changes and modifications are included in the technical scope of the present disclosure. The components of the exemplary embodiments may be arbitrarily combined without departing from the gist of the disclosure.

The present disclosure is applicable to a moving line analysis system and a moving line analysis method which efficiently acquire a moving line analysis image capable of accurately ascertaining the movement of customers within a store which is truly requested by the store by precisely analyzing moving line information of not all customers pictured in a target area but each customer.

What is claimed is:

1. A person counting area setting method comprising:
    displaying a captured image of an imaging area captured by a camera device on a display;
    displaying a first setting screen that includes a plurality of position selection icons outside of and surrounding the captured image on the display;
    in response to a selection of one of the position selection icons,
        inputting a first parameter indicating a position of a gate included in the captured image of the imaging area captured by the camera device, the first parameter indicating the position of the gate included in the captured image being based on a position of the one of the position selection icons selected by the selection,
    generating an image of a person counting area including a line for counting a number of one or more persons who pass through the gate included in the captured image, and
    displaying the generated image of the person counting area including the line on the display such that the generated image of the person counting area including the line is superimposed on the captured image and such that the line has a same length as a width of the gate included in the captured image of the imaging area captured by the camera device;
    transmitting information regarding the person counting area including the line to the camera device; and
    storing the information regarding the person counting area including the line for the camera device.

2. The person counting area setting method of claim 1, wherein the person counting area includes a person detection area including the line, and a door mask area including the gate, an object in the door mask area being omitted as a person counting target of the camera device.

3. The person counting area setting method of claim 1, wherein a plurality of images for the person counting area is generated, and
the images for the person counting area are displayed on the display so as to be superimposed on the captured image.

4. The person counting area setting method of claim 1, wherein a position of the person counting area displayed so as to be superimposed on the captured image is updated based on input of a second parameter for adjusting the position of the person counting area.

5. The person counting area setting method of claim 1, further comprising:
    displaying a line generation icon on the display,
    wherein the displaying of the generated image of the person counting area including the line on the display such that the generated image of the person counting area including the line is superimposed on the captured image and such that the line has the same length as the width of the gate included in the captured image is in response to the selection of the one of the position selection icons and a selection of the line generation icon.

6. A moving line analysis system comprising:
    a camera device; and
    a server that communicates with the camera device,
    wherein the server, in operation:
        displays a captured image acquired by the camera device on a display,
        displays a first setting screen that includes a plurality of position selection icons outside of and surrounding the captured image on the display;
        in response to a selection of one of the position selection icons,
            inputs a first parameter indicating a position of a gate included in the captured image acquired by the camera device, the first parameter indicating the position of the gate included in the captured image being based on a position of the one of the position selection icons selected by the selection, generates an image of a person counting area including a line for counting a number of one or more persons who pass through the gate included in the captured image, displays the generated image of the person counting area including the line on the display such that the generated image of the person counting area including the line is superimposed on the captured image and such that the line has a same length as a width of the gate included in the captured image acquired by the camera device, and transmits information regarding the person counting area including the line to the camera device, and wherein the camera device, in operation:

stores the information regarding the person counting area including the line transmitted from the server, counts the number of persons who pass through the person counting area including the line based on the information regarding the person counting area including the line, and transmits the captured image acquired for a predetermined period in association with a counting result of the number of persons who pass through the person counting area including the line to the server.

7. The moving line analysis system of claim 6, wherein the server displays a line generation icon on the display, and the generated image of the person counting area including the line is displayed on the display such that the generated image of the person counting area including the line is superimposed on the captured image and such that the line has the same length as the width of the gate included in the captured image is in response to the selection of the one of the position selection icons and a selection of the line generation icon.

8. A camera device connected to a server, the camera device comprising:

an imaging sensor that, in operation, captures an image of an imaging area;

at least one processor that, in operation, acquires information regarding a person counting area including a line for counting a number of one or more persons who pass through a gate included in the image of the imaging area captured by the imaging sensor from the server, the line having a same length as a width of the gate included in the image of the imaging area captured by the imaging sensor, the information regarding the person counting area including the line is generated in response to a selection of one of a plurality of position selection icons displayed in a first setting screen displayed on a display, the selection of the one of the position selection icons causing input of a first parameter indicating a position of the gate included in the captured image displayed on the display, the position selection icons being arranged outside of and surrounding the captured image, and the first parameter indicating the position of the gate included in the captured image being based on a position of the one of the position selection icons selected by the selection;

stores the acquired information regarding the person counting area including the line;

counts the number of persons who pass through the person counting area including the line based on the information regarding the person counting area including the line; and a transmitter that, in operation, transmits the captured image acquired for a predetermined period in association with a counting result of the number of persons who pass through the person counting area including the line to the server.

9. The camera device of claim 8, wherein a line generation icon is displayed on the display, and the information regarding the person counting area including the line is generated in response to the selection of the one of the position selection icons and a selection of the line generation icon displayed on the display.

* * * * *